US012610268B2

(12) United States Patent
Sakhnini et al.

(10) Patent No.: US 12,610,268 B2
(45) Date of Patent: Apr. 21, 2026

(54) DYNAMIC ADJUSTMENT OF MEASUREMENT REPORTING CHARACTERISTICS

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 252 days.

(21) Appl. No.: 18/345,055

(22) Filed: Jun. 30, 2023

(65) Prior Publication Data
US 2025/0008360 A1 Jan. 2, 2025

(51) Int. Cl.
H04B 17/20 (2015.01)
H04B 17/24 (2015.01)
(Continued)

(52) U.S. Cl.
CPC ............ H04W 24/10 (2013.01); H04B 17/24 (2015.01); H04B 17/252 (2023.05);
(Continued)

(58) Field of Classification Search
CPC ............ H04B 17/0082–409; H04W 24/02–10; H04W 84/02–16; H04W 88/02–12; H04W 92/02–04; H04W 92/10
See application file for complete search history.

(56) References Cited

U.S. PATENT DOCUMENTS

| | | | | |
|---|---|---|---|---|
| 2020/0322887 A1* | 10/2020 | Pao | ...................... | H04W 24/10 |
| 2022/0239359 A1* | 7/2022 | Pezeshki | ............... | H04W 24/10 |

(Continued)

FOREIGN PATENT DOCUMENTS

| | | | | |
|---|---|---|---|---|
| WO | WO-2022081893 A1 * | 4/2022 | ............ | H04W 24/10 |
| WO | WO-2022084924 A1 | 4/2022 | | |

OTHER PUBLICATIONS

International Search Report and Written Opinion—PCT/US2024/035292—ISA/EPO—Dec. 9, 2024.
(Continued)

*Primary Examiner* — Timothy J Weidner
(74) *Attorney, Agent, or Firm* — Holland & Hart LLP

(57) ABSTRACT
Methods, systems, and devices for wireless communications are described. A user equipment (UE) may receive a message indicating a set of measurement report occasions for transmission of measurement reports associated with a first periodicity between measurement report occasions, the measurement reports associated with a first indicator size for reporting indicators of beams. The UE may measure reference signals associated with the measurement reports to determine potential beams for communications with the network entity. The UE may transmit a measurement report including one or more indicators, each indicator indicating one of the potential beams, and each indicator may have a second indicator size smaller than the first indicator size based on the quantity of the potential beams. Further, the UE may transmit measurement reports with a second periodicity different from the first periodicity based on a reporting metric being within a first value range of a set of value ranges.

30 Claims, 18 Drawing Sheets

(51) Int. Cl.

| | |
|---|---|
| *H04W 24/08* | (2009.01) |
| *H04W 24/10* | (2009.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ............ *H04W 24/08* (2013.01); *H04W 84/02* (2013.01); *H04W 88/02* (2013.01); *H04W 88/08* (2013.01); *H04W 92/02* (2013.01); *H04W 92/10* (2013.01)

(56) References Cited

U.S. PATENT DOCUMENTS

| | | | |
|---|---|---|---|
| 2023/0379860 A1* | 11/2023 | Rao ....................... | H04W 24/10 |
| 2024/0015543 A1* | 1/2024 | Cheema ................ | H04W 24/10 |
| 2026/0032498 A1 | 1/2026 | Sakhnini et al. | |

OTHER PUBLICATIONS

Partial International Search Report—PCT/US2024/035292—ISA/EPO—Oct. 18, 2024.

* cited by examiner

210

205

215-a 215-b

235

105-a 115-a

Measurement Report Occasion Configuration 205

Reference Signals 210

Measurement Report 215

200

105-b 115-c

505 — Measurement Report Configuration

510 — Set of Reference Signals

Select Periodicity — 515

Measurement Reports — 520

500

1110

1120

1115

1105

1100

130

105

115

Network
Entity

Transceiver

1410

Antenna

1415

Communications
Manager

1420

Memory

Code

1430

1425

1440

Processor

1435

1405

1400

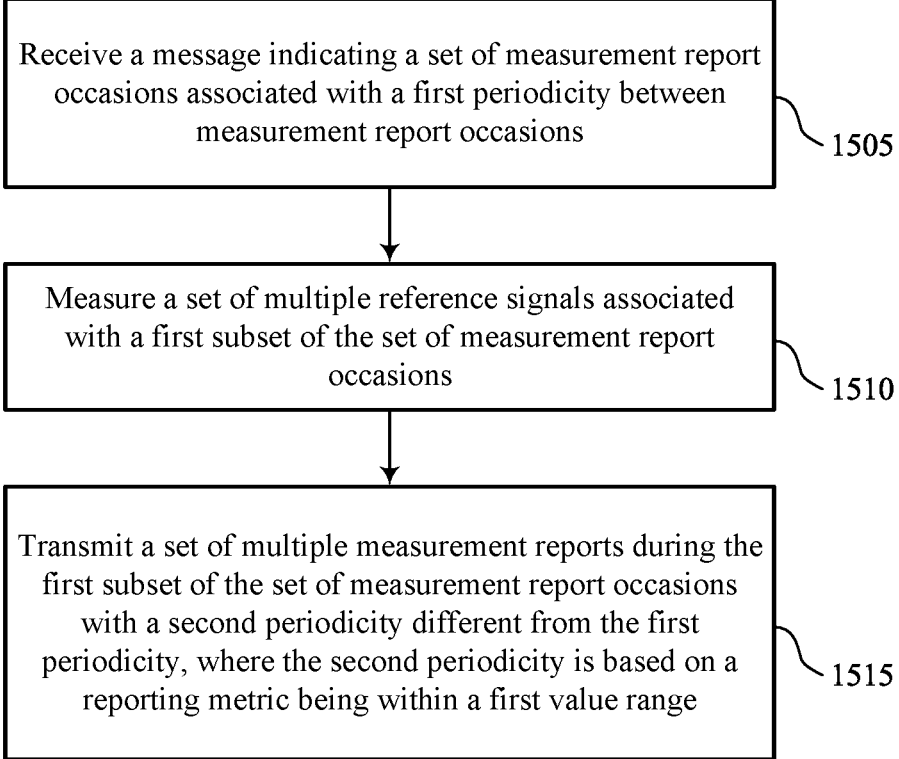

Receive a message indicating a set of measurement report occasions associated with a first periodicity between measurement report occasions

1505

Measure a set of multiple reference signals associated with a first subset of the set of measurement report occasions

1510

Transmit a set of multiple measurement reports during the first subset of the set of measurement report occasions with a second periodicity different from the first periodicity, where the second periodicity is based on a reporting metric being within a first value range

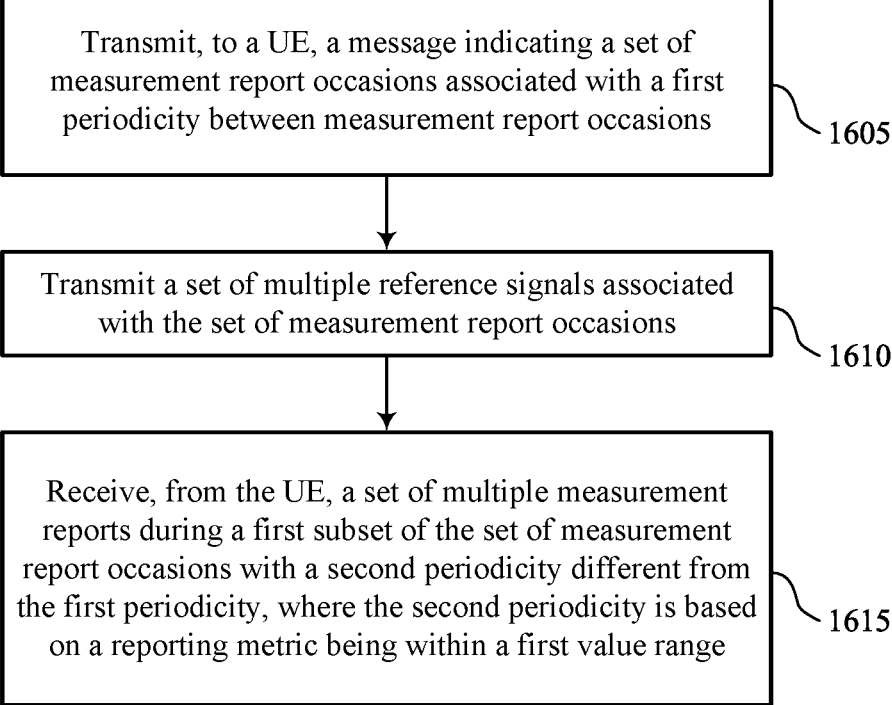

Transmit, to a UE, a message indicating a set of measurement report occasions associated with a first periodicity between measurement report occasions

1605

Transmit a set of multiple reference signals associated with the set of measurement report occasions

1610

Receive, from the UE, a set of multiple measurement reports during a first subset of the set of measurement report occasions with a second periodicity different from the first periodicity, where the second periodicity is based on a reporting metric being within a first value range

Figure 17:
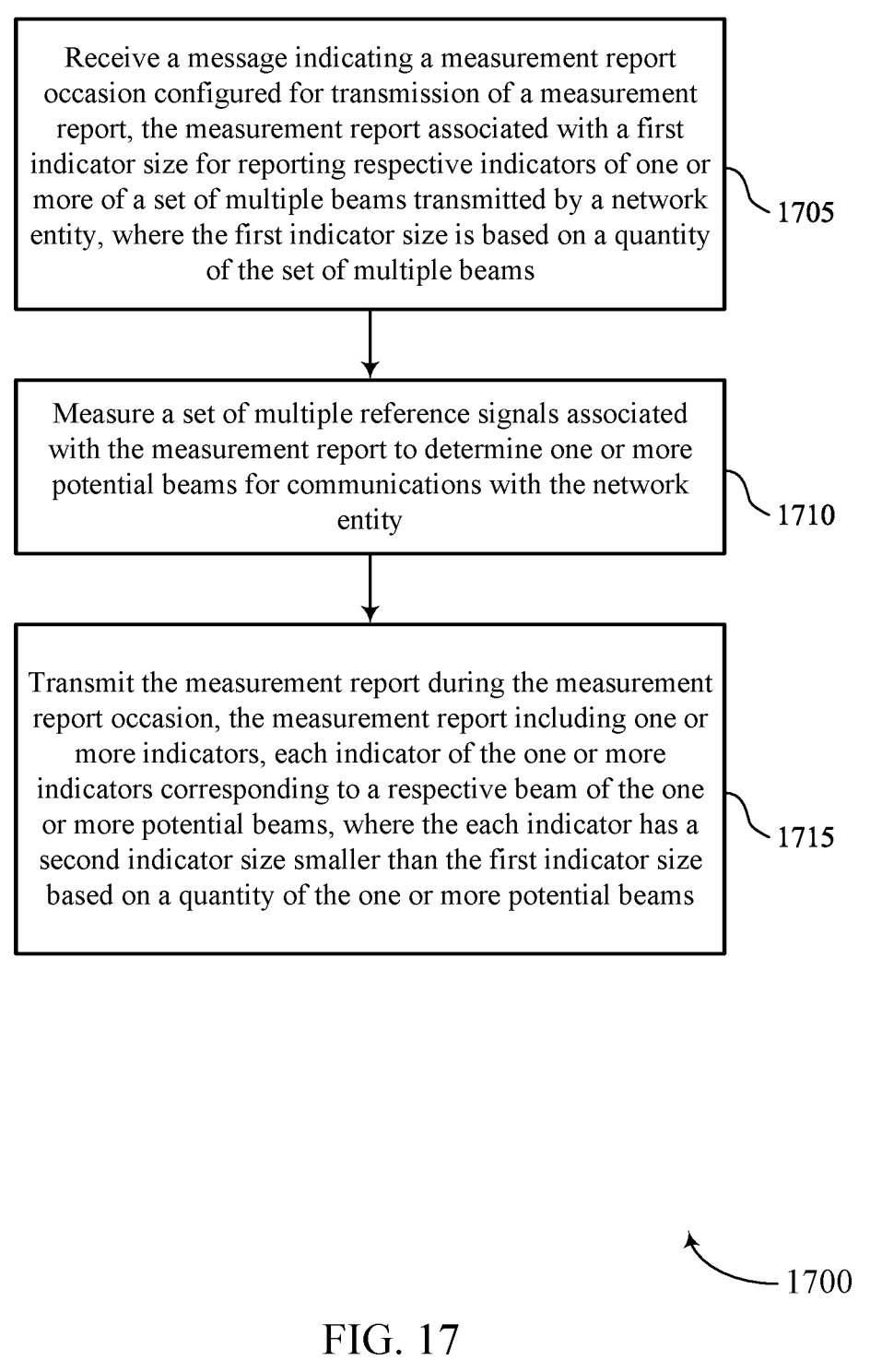

Receive a message indicating a measurement report occasion configured for transmission of a measurement report, the measurement report associated with a first indicator size for reporting respective indicators of one or more of a set of multiple beams transmitted by a network entity, where the first indicator size is based on a quantity of the set of multiple beams

1705

Measure a set of multiple reference signals associated with the measurement report to determine one or more potential beams for communications with the network entity

1710

Transmit the measurement report during the measurement report occasion, the measurement report including one or more indicators, each indicator of the one or more indicators corresponding to a respective beam of the one or more potential beams, where the each indicator has a second indicator size smaller than the first indicator size based on a quantity of the one or more potential beams

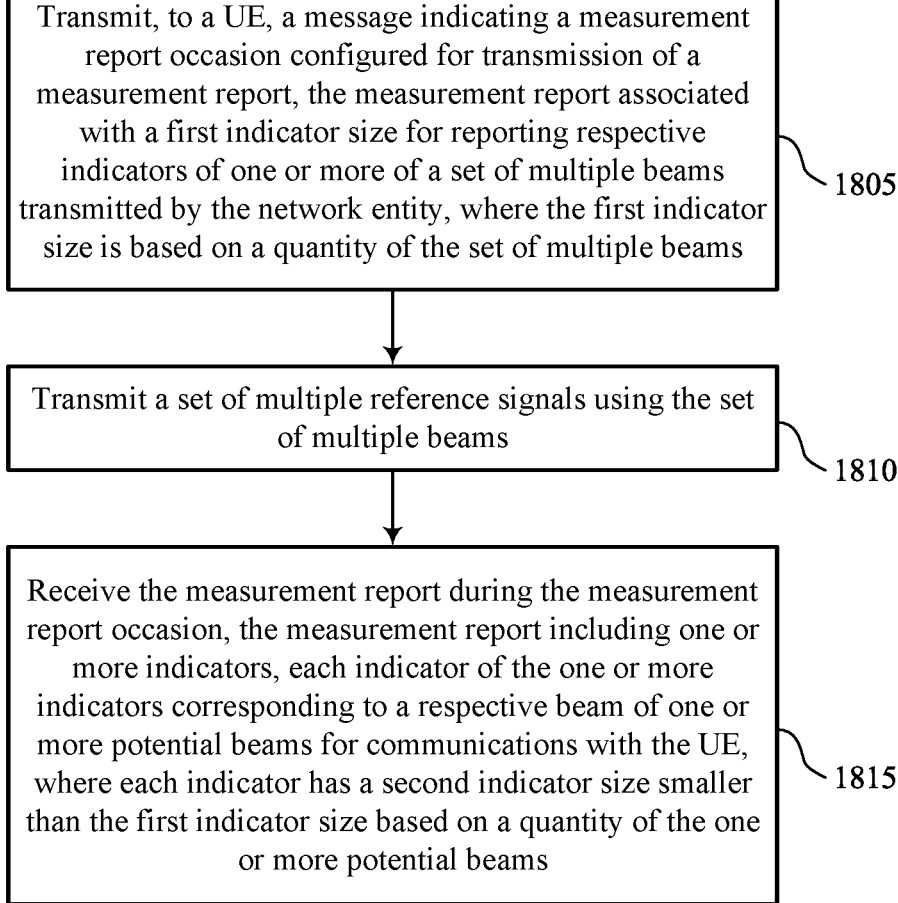

Transmit, to a UE, a message indicating a measurement report occasion configured for transmission of a measurement report, the measurement report associated with a first indicator size for reporting respective indicators of one or more of a set of multiple beams transmitted by the network entity, where the first indicator size is based on a quantity of the set of multiple beams

1805

Transmit a set of multiple reference signals using the set of multiple beams

1810

Receive the measurement report during the measurement report occasion, the measurement report including one or more indicators, each indicator of the one or more indicators corresponding to a respective beam of one or more potential beams for communications with the UE, where each indicator has a second indicator size smaller than the first indicator size based on a quantity of the one or more potential beams

DYNAMIC ADJUSTMENT OF MEASUREMENT REPORTING CHARACTERISTICS

FIELD OF TECHNOLOGY

The following relates to wireless communications, including dynamic adjustment of measurement reporting characteristics such as measurement period or resource indicator size.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A UE may transmit measurement reports to a network entity based on measurements of reference signals, and the measurement reports may include an indication of measurement values associated with a set of beams for communications by the UE with the network entity. In some cases, the UE may transmit the measurement reports with a periodicity indicated or configured by the network entity, and the UE may indicate the one or more beams using an indicator having a configured indicator size. In some cases, measurement reports may result in more overhead than may be necessary. Reducing the overhead associated with the measurement reports may prove challenging, however, as reduced overhead reporting may not provide sufficient information to the network entity, for example, if some conditions associated with the UE change.

SUMMARY

The described techniques relate to improved methods, systems, devices, and apparatuses that support dynamic adjustment of measurement reporting characteristics. For example, the described techniques provide for a UE to receive a message indicating a set of measurement report occasions for transmission of measurement reports. The measurement report occasions may be associated with a first periodicity between measurement report occasions, and the measurement reports may be associated with a first indicator size for reporting indicators of one or more of a plurality of beams transmitted by a network entity. The UE may measure reference signals associated with the measurement reports to determine one or more potential beams for communications with the network entity. The UE may transmit a measurement report including one or more indicators, each indicator corresponding to each of the one or more potential beams, and each indicator may have a second indicator size smaller than the first indicator size based on the quantity of the one or more potential beams. Additionally, or alternatively, the UE may transmit measurement reports with a second periodicity different from the first periodicity based on a reporting metric being within a first value range of a set of value ranges.

A method for wireless communications by a UE is described. The method may include receiving a message indicating a set of measurement report occasions associated with a first periodicity between measurement report occasions of the set of measurement report occasions, measuring a set of multiple reference signals associated with a first subset of the set of measurement report occasions, and transmitting a set of multiple measurement reports during the first subset of the set of measurement report occasions with a second periodicity different from the first periodicity, where the second periodicity is based on a reporting metric being within a first value range of a set of value ranges.

A UE for wireless communications is described. The UE may include one or more memories storing processor executable code, and one or more processors coupled with the one or more memories. The one or more processors may individually or collectively operable to execute the code to cause the UE to receive a message indicating a set of measurement report occasions associated with a first periodicity between measurement report occasions of the set of measurement report occasions, measure a set of multiple reference signals associated with a first subset of the set of measurement report occasions, and transmit a set of multiple measurement reports during the first subset of the set of measurement report occasions with a second periodicity different from the first periodicity, where the second periodicity is based on a reporting metric being within a first value range of a set of value ranges.

Another UE for wireless communications is described. The UE may include means for receiving a message indicating a set of measurement report occasions associated with a first periodicity between measurement report occasions of the set of measurement report occasions, means for measuring a set of multiple reference signals associated with a first subset of the set of measurement report occasions, and means for transmitting a set of multiple measurement reports during the first subset of the set of measurement report occasions with a second periodicity different from the first periodicity, where the second periodicity is based on a reporting metric being within a first value range of a set of value ranges.

A non-transitory computer-readable medium storing code for wireless communications is described. The code may include instructions executable by a processor to receive a message indicating a set of measurement report occasions associated with a first periodicity between measurement report occasions of the set of measurement report occasions, measure a set of multiple reference signals associated with a first subset of the set of measurement report occasions, and transmit a set of multiple measurement reports during the first subset of the set of measurement report occasions with a second periodicity different from the first periodicity, where the second periodicity is based on a reporting metric being within a first value range of a set of value ranges.

In some examples of the method, UEs, and non-transitory computer-readable medium described herein, the reporting metric includes a received power measurement value, a signal to interference-plus-noise ratio, a value associated with mobility of the UE, a size of a measurement report of the set of multiple measurement reports, a power value associated with the UE, or a combination thereof.

In some examples of the method, UEs, and non-transitory computer-readable medium described herein, the second periodicity may be a lower periodicity than the first periodicity and the UE suppresses transmission of measurement reports during a second subset of the set of measurement report occasions based on the second periodicity.

Some examples of the method, UEs, and non-transitory computer-readable medium described herein may further include operations, features, means, or instructions for receiving a second message that indicates the second periodicity based on the reporting metric being within the first value range, where transmitting the set of multiple measurement reports with the second periodicity may be based on receiving the second message.

In some examples of the method, UEs, and non-transitory computer-readable medium described herein, the first periodicity may be associated with a second value range of the set of value ranges.

The method, UEs, and non-transitory computer-readable medium described herein may include further operations, features, means, or instructions for transmitting a second set of multiple measurement reports during each measurement report occasion of the set of measurement report occasions over a second duration based on a change in the reporting metric, the reporting metric being within the second value range of the set of value ranges for the second duration.

Some examples of the method, UEs, and non-transitory computer-readable medium described herein may further include operations, features, means, or instructions for transmitting, over a third duration, a third set of multiple measurement reports during a second subset of the set of measurement report occasions with a third periodicity based on a change in the reporting metric, the reporting metric being within a third value range of the set of value ranges for the third duration.

Some examples of the method, UEs, and non-transitory computer-readable medium described herein may further include operations, features, means, or instructions for receiving a message that indicates a set of periodicities including at least the first periodicity and the second periodicity, where transmitting the set of multiple measurement reports may be based on receiving the message indicating the set of periodicities.

Some examples of the method, UEs, and non-transitory computer-readable medium described herein may further include operations, features, means, or instructions for receiving a message that indicates a set of thresholds, where each value range of the set of value ranges may be defined based on the set of thresholds.

Some examples of the method, UEs, and non-transitory computer-readable medium described herein may further include operations, features, means, or instructions for transmitting, prior to transmitting the set of multiple measurement reports, a message that indicates the second periodicity based on the reporting metric.

Some examples of the method, UEs, and non-transitory computer-readable medium described herein may further include operations, features, means, or instructions for transmitting the set of multiple measurement reports with the second periodicity may be based on detecting a beam failure, detecting that measured values associated with the set of multiple reference signals may be below a threshold value, or both.

A method for wireless communications by a network entity is described. The method may include transmitting, to a UE, a message indicating a set of measurement report occasions associated with a first periodicity between measurement report occasions of the set of measurement report occasions, transmitting a set of multiple reference signals associated with the set of measurement report occasions, and receiving, from the UE, a set of multiple measurement reports during a first subset of the set of measurement report occasions with a second periodicity different from the first periodicity, where the second periodicity is based on a reporting metric being within a first value range of a set of value ranges.

A network entity for wireless communications is described. The network entity may include one or more memories storing processor executable code, and one or more processors coupled with the one or more memories. The one or more processors may individually or collectively operable to execute the code to cause the network entity to transmit, to a UE, a message indicating a set of measurement report occasions associated with a first periodicity between measurement report occasions of the set of measurement report occasions, transmit a set of multiple reference signals associated with the set of measurement report occasions, and receive, from the UE, a set of multiple measurement reports during a first subset of the set of measurement report occasions with a second periodicity different from the first periodicity, where the second periodicity is based on a reporting metric being within a first value range of a set of value ranges.

Another network entity for wireless communications is described. The network entity may include means for transmitting, to a UE, a message indicating a set of measurement report occasions associated with a first periodicity between measurement report occasions of the set of measurement report occasions, means for transmitting a set of multiple reference signals associated with the set of measurement report occasions, and means for receiving, from the UE, a set of multiple measurement reports during a first subset of the set of measurement report occasions with a second periodicity different from the first periodicity, where the second periodicity is based on a reporting metric being within a first value range of a set of value ranges.

A non-transitory computer-readable medium storing code for wireless communications is described. The code may include instructions executable by a processor to transmit, to a UE, a message indicating a set of measurement report occasions associated with a first periodicity between measurement report occasions of the set of measurement report occasions, transmit a set of multiple reference signals associated with the set of measurement report occasions, and receive, from the UE, a set of multiple measurement reports during a first subset of the set of measurement report occasions with a second periodicity different from the first periodicity, where the second periodicity is based on a reporting metric being within a first value range of a set of value ranges.

In some examples of the method, network entities, and non-transitory computer-readable medium described herein, the reporting metric includes a received power measurement value, a signal to interference-plus-noise ratio, a value associated with mobility of the UE, a size of a measurement report of the set of multiple measurement reports, a power value associated with the UE, or a combination thereof.

In some examples of the method, network entities, and non-transitory computer-readable medium described herein, the second periodicity may be a lower periodicity than the first periodicity and the network entity suppresses monitoring for measurement reports from the UE during a second subset of the set of measurement report occasions based on the second periodicity.

Some examples of the method, network entities, and non-transitory computer-readable medium described herein may further include operations, features, means, or instructions for transmitting a second message that indicates the second periodicity based on the reporting metric being within the first value range, where receiving the set of multiple measurement reports with the second periodicity may be based on receiving the second message.

In some examples of the method, network entities, and non-transitory computer-readable medium described herein, the first periodicity may be associated with a second value range of the set of value ranges.

The method, network entities, and non-transitory computer-readable medium described herein may include further operations, features, means, or instructions for receiving a second set of multiple measurement reports during each measurement report occasion of the set of measurement report occasions over a second duration based on a change in the reporting metric, the reporting metric being within the second value range of the set of value ranges for the second duration.

Some examples of the method, network entities, and non-transitory computer-readable medium described herein may further include operations, features, means, or instructions for receiving, over a third duration, a third set of multiple measurement reports during a second subset of the set of measurement report occasions with a third periodicity based on a change in the reporting metric, the reporting metric being within a third value range of the set of value ranges for the third duration.

Some examples of the method, network entities, and non-transitory computer-readable medium described herein may further include operations, features, means, or instructions for transmitting a message that indicates a set of periodicities including at least the first periodicity and the second periodicity, where receiving the set of multiple measurement reports may be based on receiving the message indicating the set of periodicities.

Some examples of the method, network entities, and non-transitory computer-readable medium described herein may further include operations, features, means, or instructions for transmitting a message that indicates a set of thresholds, where each value range of the set of value ranges may be defined based on the set of thresholds.

Some examples of the method, network entities, and non-transitory computer-readable medium described herein may further include operations, features, means, or instructions for receiving, prior to receiving the set of multiple measurement reports, a message that indicates the second periodicity based on the reporting metric.

A method for wireless communications by a UE is described. The method may include receiving a message indicating a measurement report occasion configured for transmission of a measurement report, the measurement report associated with a first indicator size for reporting respective indicators of one or more of a set of multiple beams transmitted by a network entity, where the first indicator size is based on a quantity of the set of multiple beams, measuring a set of multiple reference signals associated with the measurement report to determine one or more potential beams for communications with the network entity, and transmitting the measurement report during the measurement report occasion, the measurement report including one or more indicators, each indicator of the one or more indicators corresponding to a respective beam of the one or more potential beams, where the each indicator has a second indicator size smaller than the first indicator size based on a quantity of the one or more potential beams.

A UE for wireless communications is described. The UE may include one or more memories storing processor executable code, and one or more processors coupled with the one or more memories. The one or more processors may individually or collectively operable to execute the code to cause the UE to receive a message indicating a measurement report occasion configured for transmission of a measurement report, the measurement report associated with a first indicator size for reporting respective indicators of one or more of a set of multiple beams transmitted by a network entity, where the first indicator size is based on a quantity of the set of multiple beams, measure a set of multiple reference signals associated with the measurement report to determine one or more potential beams for communications with the network entity, and transmit the measurement report during the measurement report occasion, the measurement report including one or more indicators, each indicator of the one or more indicators corresponding to a respective beam of the one or more potential beams, where the each indicator has a second indicator size smaller than the first indicator size based on a quantity of the one or more potential beams.

Another UE for wireless communications is described. The UE may include means for receiving a message indicating a measurement report occasion configured for transmission of a measurement report, the measurement report associated with a first indicator size for reporting respective indicators of one or more of a set of multiple beams transmitted by a network entity, where the first indicator size is based on a quantity of the set of multiple beams, means for measuring a set of multiple reference signals associated with the measurement report to determine one or more potential beams for communications with the network entity, and means for transmitting the measurement report during the measurement report occasion, the measurement report including one or more indicators, each indicator of the one or more indicators corresponding to a respective beam of the one or more potential beams, where the each indicator has a second indicator size smaller than the first indicator size based on a quantity of the one or more potential beams.

A non-transitory computer-readable medium storing code for wireless communications is described. The code may include instructions executable by a processor to receive a message indicating a measurement report occasion configured for transmission of a measurement report, the measurement report associated with a first indicator size for reporting respective indicators of one or more of a set of multiple beams transmitted by a network entity, where the first indicator size is based on a quantity of the set of multiple beams, measure a set of multiple reference signals associated with the measurement report to determine one or more potential beams for communications with the network entity, and transmit the measurement report during the measurement report occasion, the measurement report including one or more indicators, each indicator of the one or more indicators corresponding to a respective beam of the one or more potential beams, where the each indicator has a second indicator size smaller than the first indicator size based on a quantity of the one or more potential beams.

In some examples of the method, UEs, and non-transitory computer-readable medium described herein, the one or more potential beams may be determined based on measurement values associated with the one or more potential beams being above a threshold value, a geographic position of the UE, a transmission and reception point associated with the potential beams, a size limit associated with the measurement report, or any combination thereof.

Some examples of the method, UEs, and non-transitory computer-readable medium described herein may further include operations, features, means, or instructions for receiving a message that indicates an overloaded status for one or more beams, where the one or more potential beams may be determined based on the overloaded status for the one or more beams.

In some examples of the method, UEs, and non-transitory computer-readable medium described herein, the second indicator size may be based on a location of the UE, a power limit associated with the UE, measurement values associated with the set of multiple reference signals, or a combination thereof.

In some examples of the method, UEs, and non-transitory computer-readable medium described herein, communicating, prior to the measurement report, a message that indicates the second indicator size.

A method for wireless communications by a network entity is described. The method may include transmitting, to a UE, a message indicating a measurement report occasion configured for transmission of a measurement report, the measurement report associated with a first indicator size for reporting respective indicators of one or more of a set of multiple beams transmitted by the network entity, where the first indicator size is based on a quantity of the set of multiple beams, transmitting a set of multiple reference signals using the set of multiple beams, and receiving the measurement report during the measurement report occasion, the measurement report including one or more indicators, each indicator of the one or more indicators corresponding to a respective beam of one or more potential beams for communications with the UE, where each indicator has a second indicator size smaller than the first indicator size based on a quantity of the one or more potential beams.

A network entity for wireless communications is described. The network entity may include one or more memories storing processor executable code, and one or more processors coupled with the one or more memories. The one or more processors may individually or collectively operable to execute the code to cause the network entity to transmit, to a UE, a message indicating a measurement report occasion configured for transmission of a measurement report, the measurement report associated with a first indicator size for reporting respective indicators of one or more of a set of multiple beams transmitted by the network entity, where the first indicator size is based on a quantity of the set of multiple beams, transmit a set of multiple reference signals using the set of multiple beams, and receive the measurement report during the measurement report occasion, the measurement report including one or more indicators, each indicator of the one or more indicators corresponding to a respective beam of one or more potential beams for communications with the UE, where each indicator has a second indicator size smaller than the first indicator size based on a quantity of the one or more potential beams.

Another network entity for wireless communications is described. The network entity may include means for transmitting, to a UE, a message indicating a measurement report occasion configured for transmission of a measurement report, the measurement report associated with a first indicator size for reporting respective indicators of one or more of a set of multiple beams transmitted by the network entity, where the first indicator size is based on a quantity of the set of multiple beams, means for transmitting a set of multiple reference signals using the set of multiple beams, and means for receiving the measurement report during the measurement report occasion, the measurement report including one or more indicators, each indicator of the one or more indicators corresponding to a respective beam of one or more potential beams for communications with the UE, where each indicator has a second indicator size smaller than the first indicator size based on a quantity of the one or more potential beams.

A non-transitory computer-readable medium storing code for wireless communications is described. The code may include instructions executable by a processor to transmit, to a UE, a message indicating a measurement report occasion configured for transmission of a measurement report, the measurement report associated with a first indicator size for reporting respective indicators of one or more of a set of multiple beams transmitted by the network entity, where the first indicator size is based on a quantity of the set of multiple beams, transmit a set of multiple reference signals using the set of multiple beams, and receive the measurement report during the measurement report occasion, the measurement report including one or more indicators, each indicator of the one or more indicators corresponding to a respective beam of one or more potential beams for communications with the UE, where each indicator has a second indicator size smaller than the first indicator size based on a quantity of the one or more potential beams.

In some examples of the method, network entities, and non-transitory computer-readable medium described herein, the one or more potential beams may be determined based on measurement values associated with the one or more potential beams being above a threshold value, a geographic position of the UE, a transmission and reception point associated with the one or more potential beams, a size limit associated with the measurement report, or any combination thereof.

Some examples of the method, network entities, and non-transitory computer-readable medium described herein may further include operations, features, means, or instructions for transmitting a message that indicates an overloaded status for one or more beams, where the one or more potential beams may be determined based on the overloaded status for the one or more beams.

In some examples of the method, network entities, and non-transitory computer-readable medium described herein, the second indicator size may be based on a location of the UE, a power limit associated with the UE, measurement values associated with the set of multiple reference signals, or a combination thereof.

BRIEF DESCRIPTION OF THE DRAWINGS

FIGS. 15 through 18 show flowcharts illustrating methods that support dynamic adjustment of measurement reporting characteristics in accordance with one or more aspects of the present disclosure.

DETAILED DESCRIPTION

Figure 1:
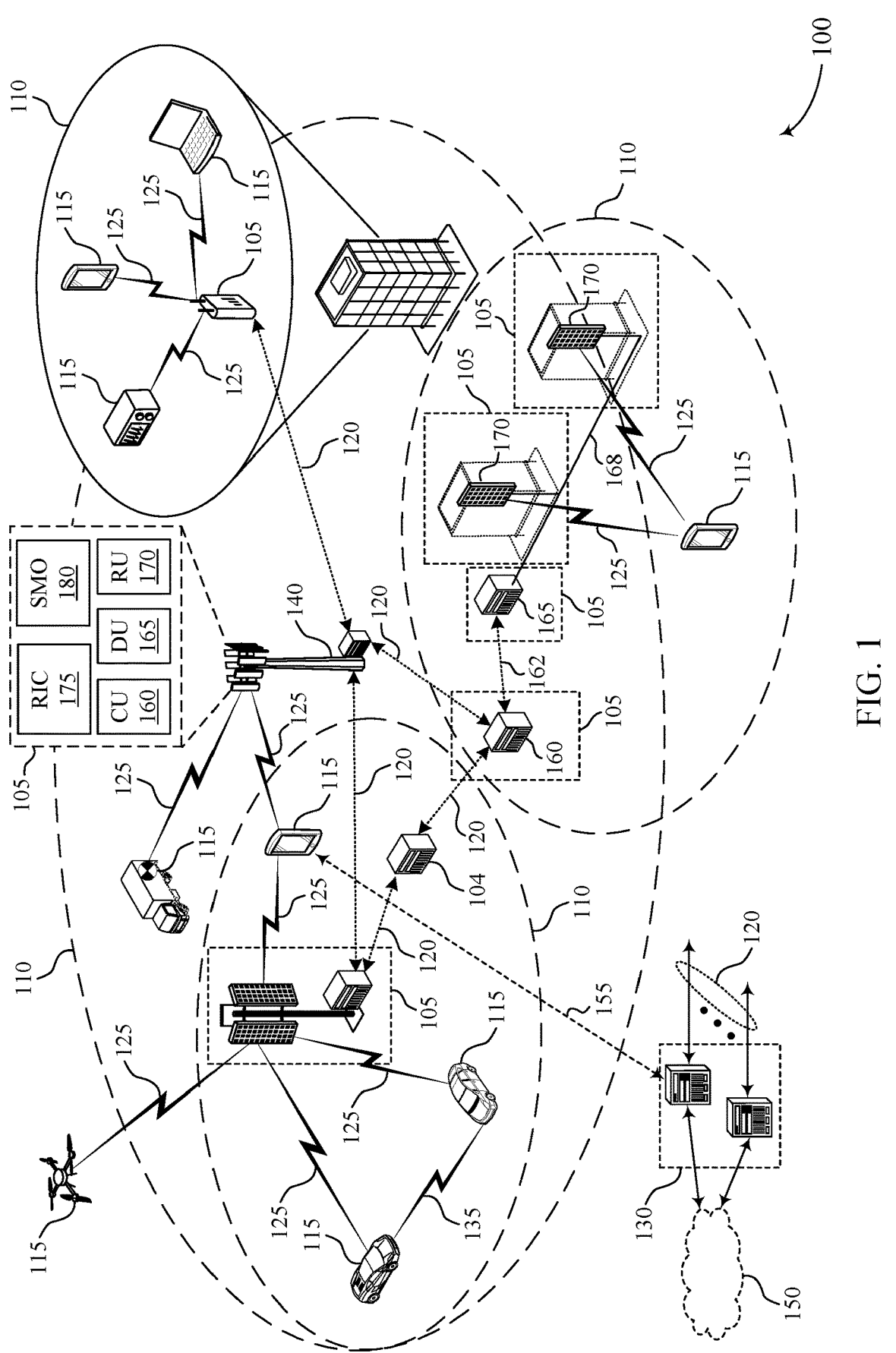
FIG. 1 shows an example of a wireless communications system that supports dynamic adjustment of measurement reporting characteristics in accordance with one or more aspects of the present disclosure.

A UE may be configured to measure a plurality of reference signals to determine one or more beams for communications with a network entity. The UE may transmit measurement reports indicating measurements associated with one or more beams during configured measurement report occasions. In some cases, however, measurement reports transmitted by the UE may have similar information. For example, if conditions (e.g., locations of the UE) between measurements are the same or similar, consecutive measurement reports may include the same or similar measurement values (e.g., reference signal received power (RSRP) values) associated with the one or more beams. As such, the UE may be performing measurement reports with a high frequency while communicating redundant information, which may result in increased overhead and power consumption without resulting in any new beam assignments for the UE. Additionally, or alternatively, the UE may be configured to report information (e.g., RSRP values) associated with all beams of a configured set of beams in each measurement report. However, many of the set of configured beams may not be visible to the UE or relevant for communications by the UE (e.g., beams having a low signal strength), and reporting measurements for all configured beams may also result in unnecessary overhead.

Accordingly, techniques for adapting the frequency of measurement reports or the quantities of beams reported in each measurement report may be desired.

In accordance with examples described herein, a UE may dynamically adjust a periodicity used for transmitting measurement reports. In some examples, the UE may determine that a reporting metric is within a value range and may adjust the periodicity based on the reporting metric. For example, the UE may determine that an RSRP value associated with reference signal measurements (e.g., of a current beam, a highest signal strength beam) is relatively high, and the UE may reduce the periodicity of measurement reports such that the UE may skip a subset of configured measurement report occasions. Additionally, or alternatively, the UE may dynamically adjust a size of indicators (e.g., resource indicators) for identifying beams in a measurement report based on a quantity of potential beams (e.g., suitable beams). For example, the UE may determine one or more potential beams, which may be a subset of a configured set of beams, based on reference signal measurements. As such, the UE may reduce a size (e.g., in bits) for indicators to a size that may still allow the UE to indicate each of the potential beams. This may reduce a total bit size for measurement reports, thereby reducing overhead and increasing coverage.

Aspects of the disclosure are initially described in the context of wireless communications systems. Aspects of the disclosure are additionally illustrated with respect to reporting diagrams and process flows. Aspects of the disclosure are further illustrated by and described with reference to apparatus diagrams, system diagrams, and flowcharts that relate to dynamic adjustment of measurement report period or resource indicator size.

FIG. 1 shows an example of a wireless communications system 100 that supports dynamic adjustment of measurement reporting characteristics in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support dynamic adjustment of measurement report period or resource indicator size as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots.

Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes (e.g., low power modes) that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, a UE 115 may be configured to perform measurement reports indicating beam measurements (e.g., RSRP values) associated with a set of beams for communications with a network entity 105. For example, the UE 115 may be configured to transmit measurement reports during configured measurement report occasions, which may have a first periodicity. In some cases, however, measurement reports transmitted by the UE 115 may have similar information. For example, if conditions (e.g., locations of the UE 115, blockage surrounding the UE 115) between measurements are the same or similar, consecutive measurement reports may include same or similar measurement values (e.g., RSRP values) associated with the one or more beams. As such, the UE 115 may be performing measurement reports with a high frequency corresponding to the first periodicity while communicating redundant information. This may result in increased overhead and power consumption at the UE 115 and the network entity 105, without resulting in any new beam assignments for the UE 115 due to the same or similar measurements.

Additionally, or alternatively, the UE 115 may be configured to report information (e.g., RSRP values) associated with all beams of the set of beams (e.g., a configured set of beams) in each measurement report. However, many beams of the set of beams may not be visible to the UE 115 or relevant for communications by the UE 115 (e.g., beams having a low signal strength). As such, including measurements values for all configured beams in a measurement report may result in unnecessary overhead. Accordingly, techniques for adapting the frequency of measurement reports or the quantities of beams reported in each measurement report may be desired.

In accordance with examples described herein, a UE 115 may dynamically adjust a periodicity used for transmitting measurement reports. In some examples, the UE 115 may determine that a reporting metric is within a value range and may adjust the periodicity based on the reporting metric. For example, the UE 115 may determine that an RSRP value associated with reference signal measurements (e.g., a highest measured RSRP, an RSRP of a current beam) is relatively high (e.g., above a threshold), and the UE 115 may reduce the periodicity of measurement reports such that the UE 115 may skip a subset of configured measurement report occasions.

Additionally or alternatively, the UE 115 may dynamically adjust a size of indicators for identifying beams in a measurement report based on a quantity of potential beams (e.g., suitable beams). For example, the UE 115 may be configured with a first size (e.g., in bits) for an indicator for identifying a beam of the set of beams. The UE 115 may determine one or more potential beams, which may be a subset of a configured set of beams, based on reference signal measurements. The UE 115 may use a second size smaller than the first size for indicators within a measurement report, and the second size may be a minimum size that allows the UE 115 to indicate each of the potential beams. This may reduce a total bit size for measurement reports, thereby reducing overhead associated with the measurement reports and increasing coverage of communications by the UE 115.

Figure 2:
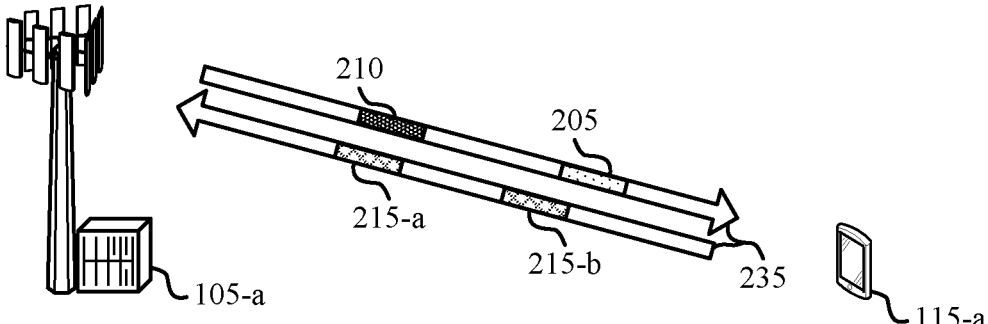
FIG. 2 shows an example of a wireless communications system that supports dynamic adjustment of measurement reporting characteristics in accordance with one or more aspects of the present disclosure.

FIG. 2 shows an example of a wireless communications system 200 that supports dynamic adjustment of measurement reporting characteristics in accordance with one or more aspects of the present disclosure. The wireless communications system 200 illustrates communications between a UE 115-a and a network entity 105-a, which may be examples of corresponding devices as described herein, with reference to FIG. 1. The UE 115-a and the network entity 105-a may communicate via communication links 235, which may be examples of a communication link 125 as described herein, with reference to FIG. 1.

The network entity 105-a may transmit a measurement report occasion configuration 205 to the UE 115-a. For example, the network entity 105-a may transmit a message (e.g., a control message, such as an RRC message) that configures the UE 115-a with a set of measurement report occasions (e.g., time occasions), resources (e.g., frequency resources) for transmitting measurement reports 215, or both. In some examples, the network entity 105-a may indicate (e.g., within the message or within a different message, such as an RRC message) one or more channel state information (CSI) reporting settings (e.g., within an information element, such as CSI-ReportConfig). For example, the network entity 105-a may indicate (e.g., within a reportQuantity field) which quantities or values associated with reference signal 210 measurements the UE 115-a is to include in the measurement reports 215. These quantities may include RSRP values (e.g., Layer 1 (L1) RSRP), signal to interference-plus-noise ratio (SINR) (e.g., L1-SINR) values, CSI-related values, or a combination thereof.

In some examples, the network entity 105-a may indicate (e.g., within the message or within a different message, such as an RRC message) one or more CSI resource settings (e.g., in an information element, such as CSI-ResourceConfig). The CSI resource settings may indicate one or more resources (e.g., time resources, frequency resources, or both) for transmission of reference signals 210. Additionally, or alternatively, the CSI resources settings may include a type of reference signal to be transmitted, which may include non-zero power (NZP) CSI-RSs, synchronization signal block (SSB) reference signals, CSI interference measurement (CSI-IM) reference signals, or a combination thereof.

In some examples, the measurement reports 215 may be configured for periodic reporting, semi-persistent reporting, or aperiodic reporting. Similarly, the reference signals 210 may be configured for periodic CSI-RS transmissions, semi-persistent CSI-RS transmissions, or aperiodic CSI-RS transmissions. In some cases, periodic reporting may be transmitted via physical uplink shared channel (PUSCH) messages. In some examples, semi-persistent reporting may be transmitted via PUSCH messages, and may be triggered by downlink control information (DCI) messages or via physical uplink control channel (PUCCH) messages, and the semi-persistent reporting may be activated or deactivated via MAC control element (MAC-CE) messages. In some cases, aperiodic reporting may be performed via transmission of PUCCH messages.

The CSI resource settings may be linked to the CSI resource settings, and the allowed linkages may depend on the reporting type of the reference signals 210 and the measurement reports 215. For example, aperiodic reporting of measurement reports 215 may be linked with any of aperiodic CSI-RS, semi-persistent CSI-RS, and periodic CSI-RS. Meanwhile, semi-persistent reporting of measurement reports 215 may be linked with any of semi-persistent CSI-RS and periodic CSI-RS. Further, periodic reporting of measurement reports 215 may be linked with periodic CSI-RS.

In some examples, for aperiodic or semi-persistent reporting, the UE 115-a may be configured with one or more sets of trigger states. Each trigger state may contain a list of CSI report configurations, which may indicate a resource set identification (ID) associated with resources (e.g., frequency resources) for transmission of measurement reports 215. Each trigger state may also include or be associated with a CSI report configuration. The one or more sets of trigger states may be configured to the UE 115-a via an RRC message. The trigger states may be triggered via a PUSCH message (e.g., a DCI message) or a MAC-CE message which may indicate a trigger state from the one or more sets of trigger states.

The UE 115-a may be configured (e.g., by the measurement report occasion configuration 205) to perform measurement reports 215 during the configured set of measurement report occasions with a first periodicity (e.g., corresponding to a first period between consecutive measurement reports 215). In some cases, however, consecutive measurement reports 215 transmitted by the UE 115-a may have similar information. For example, if conditions such as locations of the UE 115-a or blockage surrounding the UE 115-a are the same or similar between reference signal 210 measurements, consecutive measurement reports 215 may include same or similar measurement values (e.g., RSRP values, SINR values) associated with the reference signal 210 measurements. Further, even if the conditions change, there may be multiple measurement reports 215 that report the new conditions before the network entity 105-a notifies the UE 115-a of a beam switch. As such, the UE 115-a may be performing measurement reports with a high frequency corresponding to the first periodicity while communicating redundant information. This may result in increased overhead and power consumption at the UE 115-a and the network entity 105-a, without resulting in any new beam assignments for the UE 115-a due to the same or similar measurements.

In accordance with examples as described herein, the UE 115-a may transmit measurement reports 215 with an adaptive (e.g., dynamic) report period. For example, the UE 115-a may change a periodicity (e.g., a period between measurement reports 215), or the UE 115-a may suppress (e.g., skip) measurement reports during one or more measurement report occasions. In some examples, the UE 115-a may autonomously adapt the periodicity based on a reporting metric, which may be based on measured RSRP values, measured SINR values, mobility (e.g., location changes) of the UE 115-a, a configured measurement report 215 size, a power of the UE 115-a (e.g., if the UE 115-a operates in a low power mode), or any combination thereof. Details regarding the reporting metric are described in further detail herein, with reference to FIG. 3.

In some examples, the UE 115-a may determine to transmit measurement reports 215 with a second periodicity that is lower than a first periodicity configured to the UE 115-a. For example, the UE 115-a may determine (e.g., based on the reporting metric) that measured RSRP values or SINR values are relatively high (e.g., within a value range, or above a threshold value). Additionally, or alternatively, the UE 115-a may determine that the UE 115-a has not moved (e.g., greater than a threshold distance). As such, the UE 115-a may select a second periodicity corresponding to a larger period between consecutive measurement reports 215. For instance, the UE 115-a may transmit a first measurement report 215-a on a first measurement report occasion of the configured set of measurement report occasions, and the UE 115-a may transmit a second measurement report 215-b on a third measurement report occasion of the configured set of measurement report occasions, suppressing (e.g., skipping) a measurement report transmission during a second measurement report occasion occurring between the first and third measurement report occasions.

In some cases, for each measurement included in a measurement report 215, the UE 115 may include an indication of a CSI report setting, one or more indicators, such as a CSI-RS resource indicator (CRI) or a SSB resource indicator (SSBRI), and a measurement value (e.g., an RSRP value or a SINR value). Each indicator may indicate a respective resource measured by the UE 115-a (e.g., one of the reference signals 210), which may be associated with a respective beam of the configured set of beams. In some examples, a first measurement included in a measurement report 215 may be a measurement with a highest measured value, which may be indicated as an absolute value (e.g., quantized to some quantity of bits, such as 7 bits). Subsequent measurements in the measurement report 215 corresponding to the same CSI report setting may be indicated as relative values (e.g., as a difference from the highest measured value, quantized to some quantity of bits, such as 4 bits). The UE 115-a may be configured to perform measurement reports 215 based on a timing after a reference signal 210 transmission, which may be indicated to the UE 115-a by the network entity 105-a (e.g., as a field in an information element, such as beamReportTiming).

In some examples, the UE 115-a may be configured to perform group-based reporting. For example, in some cases, the UE 115-a may receive reference signals associated with multiple beams on multiple antenna panels, or the UE 115-a may receive multiple reflected beams transmitted by the network entity 105-a using one antenna panel. This may allow the network entity 105-a to transmit data using multiple beams (e.g., two beams), and the network entity 105-a may switch transmit beams to another beam in a same group with a shorter delay. In some examples, when group-based reporting is enabled, the UE 115-a may report two measurements (e.g., including two respective indicators) for each CSI report setting.

In some cases, the UE 115-a may be configured to report information (e.g., RSRP values, SINR values) associated with all beams of the configured set of beams in each measurement report 215. Further, the UE 115-a may be configured to report values for each set of CSI report settings. However, many beams of the set of beams may not be visible to the UE 115-a or relevant for communications by the UE 115-a (e.g., beams having a low signal strength). As such, including measurements values for all configured beams in a measurement report may result in unnecessary overhead. For example, to report information for 64 beams, an SSBRI may be up to 6 bits long per each measurement reported, and CRI may be up to 7 bits long per each measurement reported. As the UE 115-*a* reports more measurements, the length of a measurement report 215 increases, leading to large overhead.

In accordance with examples as described herein, the UE 115-*a* may adapt an indicator size (e.g., a bit size, a bit width) for indicators (e.g., a resource indicator such as SSBRI or CRI) included within a measurement report 215. For example, the UE 115-*a* may select an indicator size based on a quantity of potential beams (e.g., suitable beams). The potential beams may be a subset of a set of beams configured to the UE 115-*a* for reporting measurements. For example, the UE 115-*a* may determine the set of potential beams based on some criteria, such as beams that are visible to the UE 115-*a*, beams associated with a measurement value (e.g., RSRP, SINR) above a threshold value, a geographic (e.g., spatial) proximity to the beams, a TRP associated with the beams, or an overloaded status associated with the beams. Additionally, or alternatively, the UE 115-*a* may select the potential beams based on meeting a size threshold (e.g., a maximum size requirement) for a measurement report 215. Details regarding the selection of the potential beams and the indicator size are described in more detail herein, with reference to FIG. 4.

In some examples, the UE 115-*a* may be configured (e.g., or pre-configured) with a first indicator size (e.g., 6 bits for SSBRI, 7 bits for CRI). By selecting potential beams as a subset of the set of beams configured to the UE 115-*a*, the UE 115-*a* may use a second indicator size smaller than the first indicator size based on a quantity of the potential beams. For example, if the UE 115-*a* selects 8 beams as potential beams (e.g., out of a total of 64 beams configured to the UE 115-*a*), the UE 115-*a* may use a second indicator size of 3 bits, which is sufficient to identify each of the 8 beams to the network entity 105-*a* in a measurement report 215. In some examples, for the network entity 105-*a* to identify which measurements in a measurement report 215 correspond to each beam, the UE 115-*a* may transmit a message that may indicate a correlation (e.g., a mapping) between an indicator (e.g., CRI, SSBRI) having the second indicator size and a respective beam of the potential beams. As such, in subsequent measurement reports 215, the UE 115-*a* may utilize the indicators with the second indicator size, which may reduce the length of measurement reports 215 and decrease overhead.

Accordingly, the UE 115-*a* may transmit measurement reports 215 during a subset of a configured set of measurement report occasions based on a reporting metric, which may reduce overhead and power consumption by the UE 115-*a*. Additionally, or alternatively, the UE 115-*a* may adapt an indicator size for indicators included within measurement reports 215 based on a quantity of potential beams determined by the UE 115-*a*, which may shorten the length of measurement reports 215 and reduce overhead.

Figure 3:
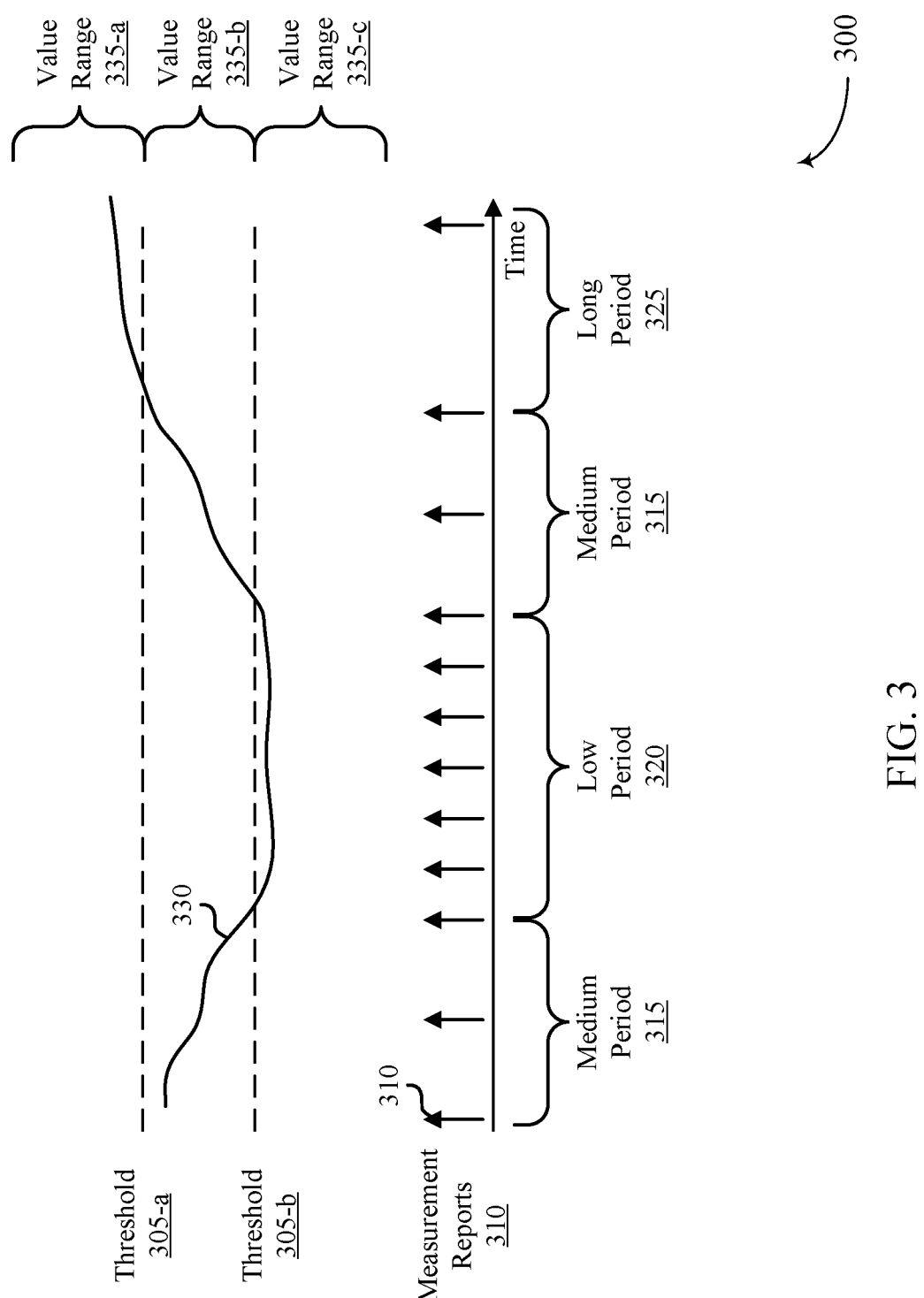
FIG. 3 shows an example of a reporting diagram that supports dynamic adjustment of measurement reporting characteristics in accordance with one or more aspects of the present disclosure.

FIG. 3 shows an example of a reporting diagram 300 that supports dynamic adjustment of measurement reporting characteristics in accordance with one or more aspects of the present disclosure. The reporting diagram 300 illustrates transmission of measurement reports 310, which may be examples of the measurement reports 215 described with reference to FIG. 2, using different periodicities based on a reporting metric 330.

In accordance with examples as described herein, the UE 115 may transmit measurement reports 310 with an adaptive (e.g., dynamic) reporting period. For example, the UE 115 may change a periodicity (e.g., a period between measurement reports 310), or the UE 115 may suppress (e.g., skip) measurement report transmissions during one or more measurement report occasions. In some cases, a selected reporting periodicity may correspond to the medium period 315 (e.g., a medium periodicity), the low period 320 (e.g., a high periodicity), or the long period 325 (e.g., a low periodicity). The UE 115 may be configured with a periodicity (e.g., a default periodicity) for performing measurement reports 310, and, in some examples, the periodicity may correspond to the low period 320. In some cases, however, consecutive measurement reports 310 transmitted by the UE 115 may have similar information, and the UE 115 may benefit from reducing the periodicity of reporting.

In some examples, the UE 115 may be configured with a set of reporting periodicities (e.g., for L1 reporting) by a network entity 105. In some cases, the network entity 105 may transmit a message (e.g., an RRC message) to configure the UE 115 with the set of reporting periodicities. Alternatively, the UE 115 may be preconfigured with the set of reporting periodicities. In some examples, the set of reporting periodicities may correspond to the medium period 315, the low period 320, and the long period 325, but two reporting periods or more than three reporting periods may also be configured to the UE 115.

In some examples, the UE 115 may be indicated a periodicity for performing measurement reports 310 by a network entity 105 (e.g., from the configured set of reporting periodicities). For example, the network entity 105 may evaluate a stability of measurements by the UE 115 and adjust the periodicity accordingly. In some examples, an indicated periodicity may correspond to a medium period 315, a low period 320, or a long period 325 (e.g., between measurement reports 310). For example, if measurements reported by the UE 115 are relatively stable (e.g., consecutive measurement reports contain same or similar measurement values, within a threshold range), the network entity 105-*a* may indicate the UE 115 to perform measurements with a reduced reporting periodicity (e.g., corresponding to the medium period 315 or the long period 325). If measurements reported by the UE 115 are not stable, and change between consecutive measurements (e.g., above a threshold amount), the network entity 105 may indicate the UE to increase the reporting periodicity (e.g., corresponding to the low period 320 or the medium period 315). The network entity 105 may dynamically indicate a reporting periodicity, and the network entity 105 may transmit a message (e.g., a DCI message, a MAC-CE message, an RRC message) to indicate the periodicity.

In some examples, the UE 115 may autonomously adapt the periodicity based on a reporting metric 330. In some cases, the reporting metric 330 may be or correspond to some criteria, such as measured RSRP values, measured SINR values, mobility (e.g., location changes) of the UE 115, a configured measurement report size, or a power of the UE 115. Alternatively, the reporting metric 330 may correspond to a combination of these criteria (e.g., based on addition operations, multiplication operations, or some formula).

In some examples, the UE 115 may adapt the periodicity based on the reporting metric 330 being within a value range 335 of a set of value ranges 335. In some examples, the set of value ranges 335 may be defined by one or more thresholds 305. In some examples, the thresholds 305 may be determined (e.g., decided) by the UE 115-*a*, for example, based on measurement values or values of the reporting metric 330. Alternatively, the thresholds 305 may be indicated in a message by the network entity 105 to the UE 115.

For example, the UE 115 may determine that the reporting metric 330 is within the value range 335-*b* (e.g., below the threshold 305-*a* and above the threshold 305-*b*), and the UE 115 may select a medium periodicity corresponding to the medium period 315 for transmission of measurement reports 310. In some cases, the reporting metric 330 may drop to the value range 335-*c* (e.g., below the threshold 305-*b*), which may correspond to lower measurement values (e.g., RSRP measurements, SINR measurements), high mobility of the UE 115, higher power level at the UE 115, or other criteria. As such, the UE 115 may select a high periodicity corresponding to the low period 320 for transmission of measurement reports 310 occurring during a first duration, which may result in the UE 115 transmitting measurement reports 310 more frequently. Similarly, the reporting metric may increase to be within the value range 335-*a* (e.g., above the threshold 305-*a*), which may correspond to higher measurement values, lower mobility of the UE 115, lower power level at the UE 115, or other criteria. Accordingly, the UE 115 may select a low periodicity corresponding to the long period 325 for transmission of measurement reports 310 occurring during a second duration, which may result in transmitting measurement reports 310 less frequently and thereby reducing overhead and power consumption.

In some cases, if the UE 115 is autonomously adapting the reporting periodicity, the network entity 105 may determine the new periodicity. In some examples, the UE 115 may transmit a message that may indicate a reporting periodicity based on selecting the reporting periodicity (e.g., based on the reporting metric 330 changing value ranges 335). Alternatively, the network entity 105 may detect the change in reporting periodicity without an explicit indication of the reporting periodicity. For example, the network entity 105 may determine that the UE 115 skipped one or more measurement report occasions, and the network entity 105 may determine an updated reporting periodicity based on the skipped measurement report occasions.

In some examples, procedures for adapting the reporting periodicity of measurement reports 310 may be enabled or disabled at the UE 115. For example, the network entity 105 may transmit a message or configuration that indicates the UE 115 to enable or disable the adaptation of the reporting periodicity for measurement reports 310. Additionally, or alternatively, the UE 115 may autonomously enable or disable the adaptation of the reporting periodicity for measurement reports 310 based on some rules or events, such as beam failure detection, if measurement values (e.g., RSRP values, SINR values) are above or below some threshold, or other rules. In some examples, the rules for enabling or disabling the adaptation for the reporting periodicity of measurement reports 310 may be configured or specified to the UE 115 in a message by the network entity 105.

Accordingly, by adapting the reporting periodicity for transmission of measurement reports 310, the UE 115 may transmit measurement reports 310 during a subset of a configured set of measurement report occasions, which may reduce overhead and power consumption by the UE 115.

Figure 4:
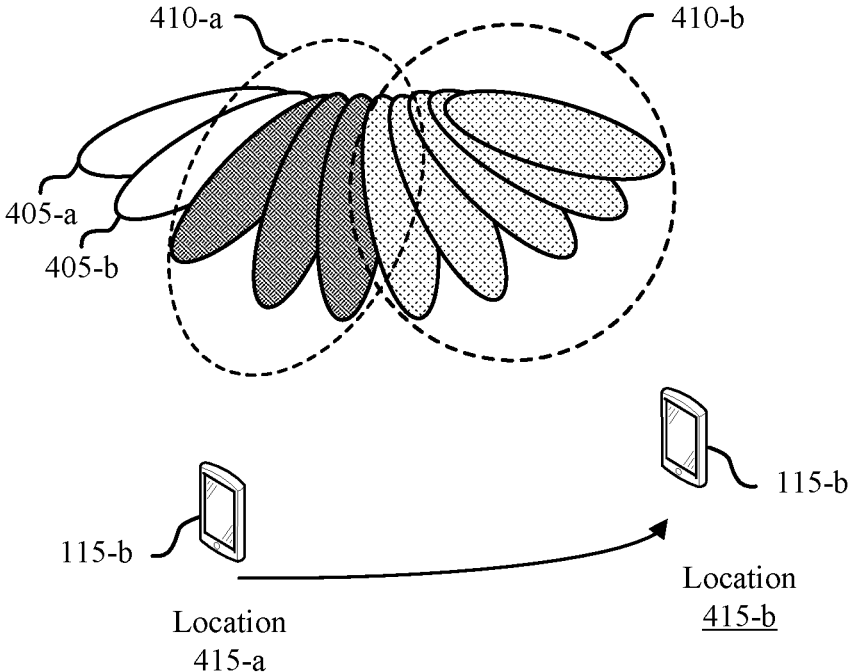
FIG. 4 shows an example of a wireless communications system that supports dynamic adjustment of measurement reporting characteristics in accordance with one or more aspects of the present disclosure.

FIG. 4 shows an example of a wireless communications system 400 that supports dynamic adjustment of measurement reporting characteristics in accordance with one or more aspects of the present disclosure. The wireless communications system 400 may include a UE 115-*b*, which may be an example of a UE 115 as described herein, with reference to FIGS. 1 through 3.

In some cases, the UE 115-*b* may be configured to report information (e.g., RSRP values, SINR values) associated with all beams 405 of a configured set of beams in each measurement report. Further, the UE 115-*b* may be configured to report values for each CSI report settings configured to the UE 115-*b*. However, many beams 405 of the set of beams may not be visible to the UE 115-*b* or relevant for communications by the UE 115-*b* (e.g., beams having a low signal strength). For example, in a location 415-*a*, a set of beams 410-*a* may be visible to the UE 115-*b*, while a beam 405-*a*, a beam 405-*b*, and a set of beams 410-*b* may not be visible to the UE 115-*b*. As such, including measurements values for all configured beams 405 in a measurement report may result in unnecessary overhead. For example, to report information for 64 beams 405 that may be configured to the UE 115-*b*, an indicator such as an SSBRI may be up to 6 bits long per each measurement reported, and a CRI may be up to 7 bits long per each measurement reported. As the UE 115-*b* reports more measurements, the length of a measurement report increases, leading to large overhead.

In accordance with examples as described herein, the UE 115-*b* may include measurement information for a subset of a set of configured beams 405 in each measurement report, and the UE 115-*b* may adapt an indicator size (e.g., a bit size, a bit width) for indicators (e.g., a resource indicator such as SSBRI or CRI) included within the measurement report. For example, the UE 115-*b* may select one or more potential beams of the configured set of beams, and the UE 115-*b* may reduce the indicator size based on a quantity of the potential beams.

The UE 115-*b* may select potential beams (e.g., suitable beams) based on some criteria. For example, at the location 415-*a*, the UE 115-*b* may select the set of beams 410-*a* as the potential beams based on each beam 405 of the set of beams 410-*a* being associated with a measurement value (e.g., an RSRP value, a SINR value) above a threshold value, based on a geographic (e.g., spatial) proximity to the set of beams 410-*a*, based on a TRP associated with the set of beams 410-*a*, based on a power of the UE 115-*b* (e.g., a power limit or requirement), or any combination thereof. The one or more potential beams 405 may also be based on a location of the UE 115-*b*. For example, as the UE 115-*b* moves to the location 415-*b*, the visible beams 405 and measurements associated with the beams 405 may change. As such, in the location 415-*b*, the UE 115-*b* may select the set of beams 410-*b* as a potential set of beams. Further, the UE 115-*b* may exclude beams 405 from measurement reports if measurement values associated with the beams 405 are below a threshold. Additionally, or alternatively, the UE 115-*b* may reduce a quantity of potential beams to report based on the UE 115-*b* having low power (e.g., operating in a low power mode).

In some examples, beams 405 of the configured set of beams may be transmitted by different TRPs, but only some TRPs may be visible by the UE 115-*b*. As such, the UE 115-*b* may select the beams 405 associated with visible TRPs (e.g., TRPs within a threshold geographical range, TRPs with an unobstructed line of sight to the UE 115-*b*), and the UE 115-*b* may select beams 405 associated a same TRP or with multiple TRPs. Additionally, or alternatively, the UE 115-*b* may select the potential beams based on a size associated with a measurement report. For example, the UE 115-*b* may be configured (e.g., by a network entity 105) with a limit on the size (e.g., length) of a measurement report. As such, the UE 115-*b* may select a quantity of potential beams such that measurement reports do not exceed the limit.

In some examples, the potential beams 405 may be indicated to the UE 115-*b* by the network entity 105, for example, as a subset of a configured set of beams. For example, the network entity 105 may indicate the potential beams 405 to the UE 115-*b* via a message, such as a DCI message, a MAC-CE message, or an RRC message, and the network entity 105 may regularly update the potential beams 405 based on conditions associated with the UE 115-*b* (e.g., reported measurements, location of the UE-b, power of the UE 115-*b*).

In some cases, one or more beams 405 supported by a network entity 105 for transmissions with the UE 115-*b* may be overloaded. For example, the network entity 105 may have a plurality of UEs 115 assigned to some beams 405, and the quantity of UEs 115 assigned to these beams 405 may be at capacity (e.g., a capacity supported by the network entity 105). In these cases, even if the UE 115-*b* indicated an overloaded beam 405 as having a high measurement value (e.g., RSRP, SINR), the network entity 105 may not assign the overloaded beam 405 to the UE 115-*b*. As such, the UE 115-*b* may exclude overloaded beams 405 from the one or more potential beams, as transmitting measurement information for the overloaded beams may be unnecessary. In some examples, the network entity 105 may transmit a message indicating one or more overloaded beams to the UE 115-*b* such that the UE 115-*b* may exclude the indicated overloaded beams from measurement reports.

The UE 115-*b* may select an indicator size based on a quantity of the selected potential beams. In some examples, the UE 115-*a* may be configured (e.g., or pre-configured) with a first indicator size for an indicator associated with identifying one or more beams 405 within a measurement report (e.g., 6 bits for SSBRI, 7 bits for CRI). The UE 115-*b* may select a second indicator size that may be smaller than the first indicator size based on the quantity of potential beams. For example, if the UE 115-*b* selects the set of beams 410-*a* as the potential beams, which may have a quantity of three beams 405, the UE 115-*b* may select an indicator size of 2 bits, which may be sufficient to identify each beam in the set of beams 410-*a*. Meanwhile, if the UE 115-*b* selects the set of beams 410-*b* as the potential beams, which may have a quantity of five beams 405, the UE 115-*b* may select an indicator size of 3 bits. In some examples, such as if the network entity 105 indicated one or more potential beams 405 to the UE 115-*b*, the network entity 105 may indicate the UE 115-*b* of a second indicator size.

To accurately receive measurement reports from the UE 115-*b*, the network entity 105 may determine the updated indicator size. For example, if the network entity 105 indicated an indicator size to the UE 115-*b*, the network entity 105 may track the indication and use the indicated indicator size to interpret the measurement reports from the UE 115-*b*. Alternatively, the UE 115-*b* may indicate a selected indicator size to the network entity 105. In some examples, the UE 115-*b* may include an indication of the indicator size within a measurement report (e.g., an L1 measurement report). In some other examples, the UE 115-*b* may indicate the indicator size within a separate message, and the message may be transmitted on a pre-configured resource (e.g., a measurement report occasion, such as a skipped occasion). In some examples, the UE 115-*b* may indicate an overall size for a measurement report (e.g., instead of the indicator size), which may allow the network entity to determine the indicator size. Alternatively, the network entity 105 may blindly detect the indicator size, for example, based on the overall size of the measurement report.

In some examples, the quantity of measurements included in a measurement report by the UE 115-*b* may be limited by the quantity of potential beams. For example, the UE 115-*b* may be subject to some rules regarding the quantity of measurements to include in a report (e.g., configured by the network entity 105 or pre-configured, dictated by a standard). In some cases, the UE 115-*b* may be limited to including a same quantity of measurements as the quantity of potential beams. For instance, the UE 115-*b* may be configured to include four measurements, but the UE 115-*b* may have selected three potential beams, so the UE 115-*b* may be limited to including three measurements in a measurement report based on the rules configured to the UE 115-*b*.

In some cases, changing the indicator size may change which indicator values correspond to which beams 405, and the network entity 105 may be unable to identify which measurements in a measurement report are associated with which beams 405. As such, the network entity 105 may transmit an indication of a mapping between indicators and respective beams 405 of the potential beams 405 to the UE 115-*b*, for example, if the network entity 105 indicates an updated indicator size to the UE 115-*b*. In some examples, the network entity 105 may transmit the indication of the mapping in response to receiving an indication of an updated indicator size from the UE 115-*b*. Alternatively, the UE 115-*b* may transmit a message that indicates a mapping between indicators and respective beams 405 of the potential beams 405. For example, the UE 115-*b* may transmit the indication of the mapping in a message that indicates a change in the indicator size, or in a measurement report.

Accordingly, the UE 115-*b* may select one or more potential beams out of a set of configured beams, and the UE 115-*b* may adapt a resource indicator size based on a quantity of the one or more potential beams, which may reduce the length of measurement reports and decrease overhead and power consumption at the UE 115-*b*.

Figure 5:
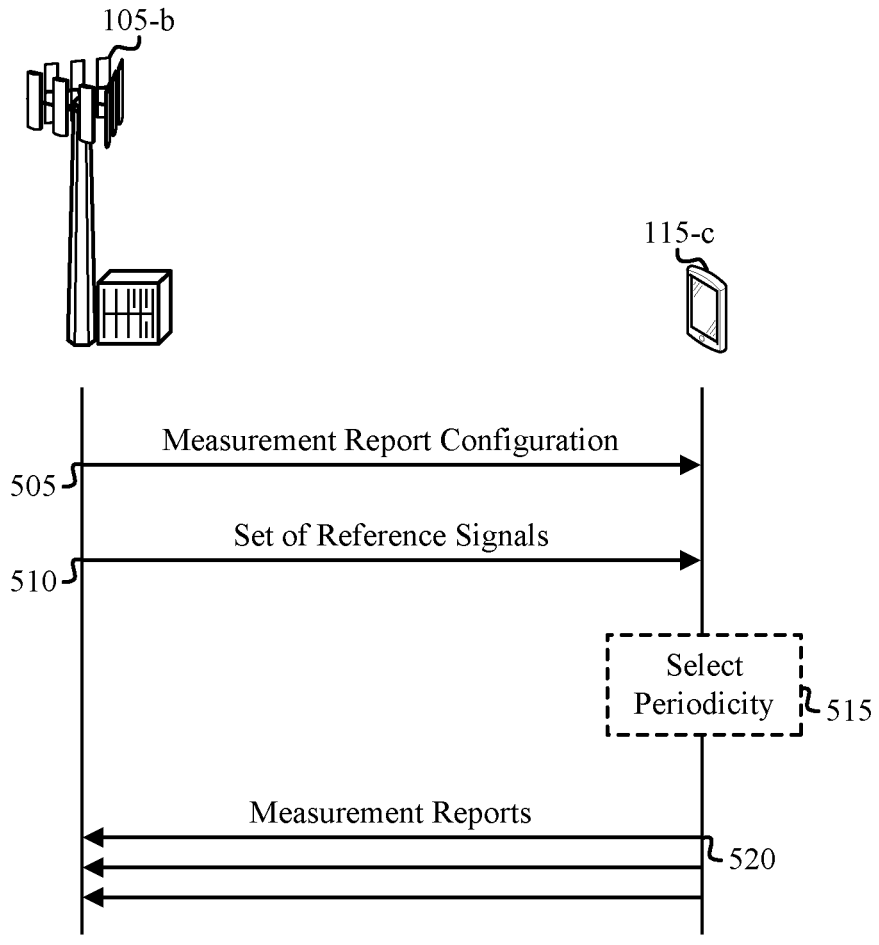
FIG. 5 shows an example of a process flow that supports dynamic adjustment of measurement reporting characteristics in accordance with one or more aspects of the present disclosure.

FIG. 5 shows an example of a process flow 500 that supports dynamic adjustment of measurement reporting characteristics in accordance with one or more aspects of the present disclosure. The process flow 500 illustrates communications between a network entity 105-*b* and a UE 115-*c*, which may be examples of corresponding devices as described herein, with reference to FIGS. 1 through 4. In some examples, steps illustrated in the process flow 500 may be performed in different orders. Additionally, some steps may be added to the process flow 500, and some steps may be omitted. The process flow 500 illustrates signaling related to adapting a periodicity for transmission of measurement reports by the UE 115-*c*, as described herein.

At 505, the network entity 105-*b* may transmit a message indicating a measurement report configuration. In some examples, the message may be a control message, such as an RRC message, and may indicates the UE 115-*c* with a set of measurement report occasions (e.g., time occasions), resources (e.g., frequency resources) for transmitting measurement reports, or both. The set of measurement report occasions may correspond to a first periodicity. In some examples, the network entity 105-*a* may indicate one or more CSI reporting settings (e.g., within an information element, such as CSI-ReportConfig), which may indicate the UE 115-*c* which quantities or measurements to include within a measurement report. Additionally, or alternatively, the network entity 105-*a* may indicate one or more CSI resource settings (e.g., in an information element, such as CSI-ResourceConfig), which may indicate one or more resources (e.g., time resources, frequency resources, or both)

for transmission of reference signals, a type of reference signal to be transmitted (e.g., NZP CSI-RSs, SSB reference signals, CSI-IM reference signals), or both.

At 510, the network entity 105-*b* may transmit a set of reference signals to the UE 115-*c*, and the UE 115-*c* may measure the set of reference signals. Each reference signal may be associated with one or more respective beams. In some examples, the reference signals may be CSI reference signals, such as NZP CSI-RS or CSI-IM reference signals, SSB reference signals, or a combination thereof, which may be indicated to the UE 115-*b* in the CSI resource settings (e.g., in within the CSI-ResourceConfig). In some cases, the reference signals may be transmitted via multiple TRPs associated with the network entity 105-*b*.

At 515, the UE 115-*c* may select a second periodicity for transmission of measurement reports that is different from the first periodicity. For example, the UE 115-*c* may select the second periodicity based on a reporting metric being within a first value range of a set of value ranges. The reporting metric may be or correspond to some criteria, such as measured RSRP values, measured SINR values, mobility (e.g., location changes) of the UE 115, a configured measurement report size, or a power of the UE 115. Alternatively, the reporting metric 330 may correspond to a combination of these criteria (e.g., based on addition operations, multiplication operations, or some formula).

At 520, the UE 115-*c* may transmit measurement reports based on the second periodicity. In some examples, the measurement reports may be L1 measurement reports transmitted via L1 signaling. The measurement reports may include one or more measured quantities, such as RSRP values (e.g., L1 RSRP), SINR (e.g., L1-SINR) values, CSI-related values, or a combination thereof. In some examples, the quantities to report may be indicated to the UE 115-*c* in the measurement report configuration as CSI reporting settings (e.g., within the CSI-ReportConfig).

Accordingly, by adapting the reporting periodicity for transmission of measurement reports, the UE 115-*c* may transmit measurement reports during a subset of a configured set of measurement report occasions, which may reduce overhead and power consumption by the UE 115-*c*.

Figure 6:
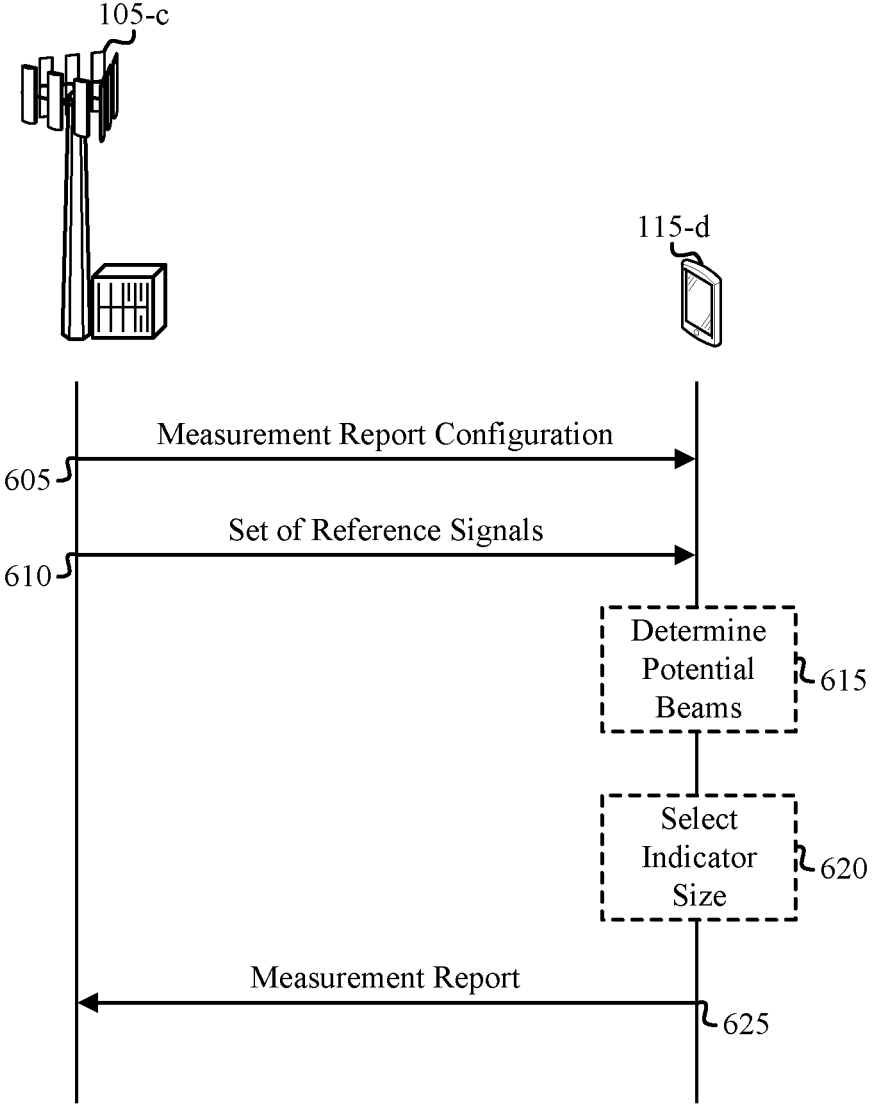
FIG. 6 shows an example of a process flow that supports dynamic adjustment of measurement reporting characteristics in accordance with one or more aspects of the present disclosure.

FIG. 6 shows an example of a process flow 600 that supports dynamic adjustment of measurement reporting characteristics in accordance with one or more aspects of the present disclosure. The process flow 600 illustrates communications between a network entity 105-*c* and a UE 115-*d*, which may be examples of corresponding devices as described herein, with reference to FIGS. 1 through 5. In some examples, steps illustrated in the process flow 600 may be performed in different orders. Additionally, some steps may be added to the process flow 600, and some steps may be omitted. The process flow 600 illustrates signaling related to adapting a resource indicator size for indicators included in measurement reports by the UE 115-*d*, as described herein.

At 605, the network entity 105-*c* may transmit a message indicating a measurement report configuration. In some examples, the message may be a control message, such as an RRC message, and may indicates the UE 115-*c* with a set of measurement report occasions (e.g., time occasions), resources (e.g., frequency resources) for transmitting measurement reports, or both. The measurement report configuration may indicate a first indicator size for indicators corresponding to a respective beam configured to the UE 115-*d*. In some examples, the network entity 105-*a* may indicate one or more CSI reporting settings (e.g., within an information element, such as CSI-ReportConfig), which may indicate the UE 115-*c* which quantities or measurements to include within a measurement report. Additionally, or alternatively, the network entity 105-*a* may indicate one or more CSI resource settings (e.g., in an information element, such as CSI-ResourceConfig), which may indicate one or more resources (e.g., time resources, frequency resources, or both) for transmission of reference signals, a type of reference signal to be transmitted (e.g., NZP CSI-RSs, SSB reference signals, CSI-IM reference signals), or both.

At 610, the network entity 105-*c* may transmit a set of reference signals to the UE 115-*d*, and the UE 115-*d* may measure the set of reference signals. Each reference signal may be associated with one or more respective beams. In some examples, the reference signals may be CSI reference signals, such as NZP CSI-RS or CSI-IM reference signals, SSB reference signals, or a combination thereof, which may be indicated to the UE 115-*d* in the CSI resource settings (e.g., in within the CSI-ResourceConfig). In some cases, the reference signals may be transmitted via multiple TRPs associated with the network entity 105-*c*.

At 615, the UE 115-*d* may determine one or more potential beams. The one or more potential beams may be a subset of a set of beams configured to the UE 115-*d* (e.g., by the network entity 105-*c*). In some examples, the potential beams may be indicated by the network entity 105-*c*, for example, via a DCI message, a MAC-CE message, or an RRC message, and the network entity 105 may regularly update the potential beams based on conditions associated with the UE 115-*d* (e.g., reported measurements, location of the UE-d, power of the UE 115-*d*).

Alternatively, the UE 115-*d* may autonomously select the one or more potential beams based on some criteria. For example, the UE 115-*d* may The UE 115-*d* may select potential beams (e.g., suitable beams) based on some criteria. For example, the UE 115-*d* may select the one or more potential beams based on each beam of the one or more potential beams being associated with a measurement value (e.g., an RSRP value, a SINR value) above a threshold value, based on a geographic (e.g., spatial) proximity to the beams, based on a TRP associated with the beams, based on a power of the UE 115-*d* (e.g., a power limit or requirement), or any combination thereof. The one or more potential beams may also be selected based on a location of the UE 115-*d* or based on an overloaded status of each beam. For example, the UE 115-*d* may exclude a beam from the one or more potential beams if the network entity 105-*c* indicates that the beam is overloaded (e.g., supporting other UEs 115 at capacity).

At 620, the UE 115-*d* may select a second indicator size smaller than the first indicator size based on a quantity of the one or more potential beams. For example, if the UE 115-*d* selects a quantity of three beams for the one or more potential beams, the UE 115-*d* may select an indicator size of 2 bits, which may be sufficient to identify each beam in the three potential beams. Meanwhile, if the UE 115-*d* selects a quantity of five beams as the one or more potential beams, the UE 115-*d* may select an indicator size of 3 bits, which may be sufficient to identify each beam of the five potential beams. In some examples, such as if the network entity 105-*c* indicated one or more potential beams 405 to the UE 115-*d*, the network entity 105-*c* may indicate the UE 115-*b* of a second indicator size.

At 625, the UE 115-*d* may transmit a measurement report including one or more indicators having the second indicator size. Accordingly, the UE 115-*d* may select one or more potential beams out of a set of configured beams, and the UE 115-*d* may adapt a resource indicator size based on a quantity of the one or more potential beams, which may reduce the length of measurement reports and decrease overhead and power consumption at the UE 115-*d*.

Figure 7:
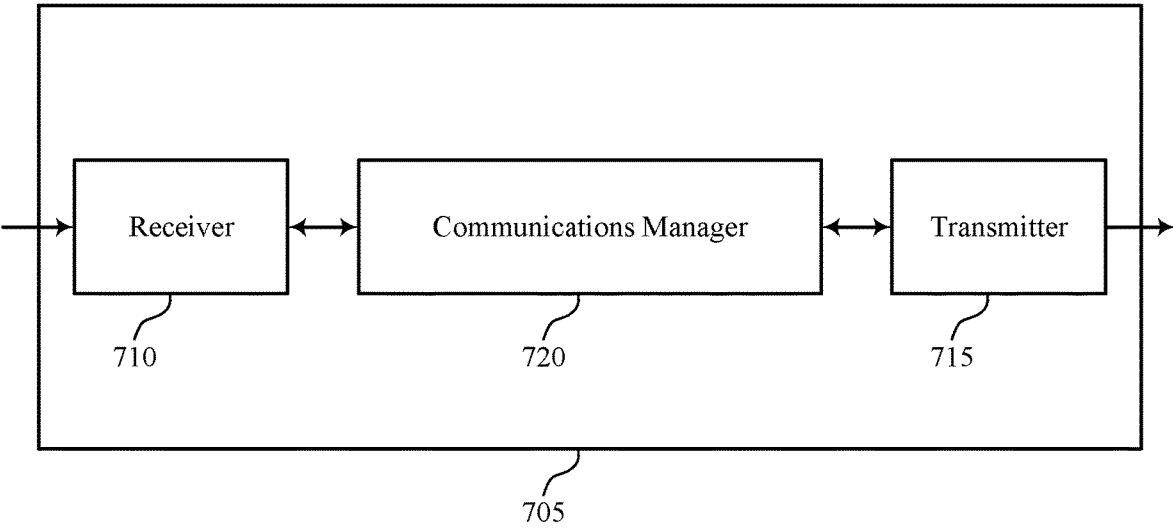
FIGS. 7 and 8 show block diagrams of devices that support dynamic adjustment of measurement reporting characteristics in accordance with one or more aspects of the present disclosure.

FIG. 7 shows a block diagram 700 of a device 705 that supports dynamic adjustment of measurement reporting characteristics in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to dynamic adjustment of measurement report period or resource indicator size). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to dynamic adjustment of measurement report period or resource indicator size). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of dynamic adjustment of measurement report period or resource indicator size as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications by a UE in accordance with examples as disclosed herein. For example, the communications manager 720 is capable of, configured to, or operable to support a means for receiving a message indicating a set of measurement report occasions associated with a first periodicity between measurement report occasions of the set of measurement report occasions. The communications manager 720 is capable of, configured to, or operable to support a means for measuring a set of multiple reference signals associated with a first subset of the set of measurement report occasions. The communications manager 720 is capable of, configured to, or operable to support a means for transmitting a set of multiple measurement reports during the first subset of the set of measurement report occasions with a second periodicity different from the first periodicity, where the second periodicity is based on a reporting metric being within a first value range of a set of value ranges.

Additionally, or alternatively, the communications manager 720 may support wireless communications by a UE in accordance with examples as disclosed herein. For example, the communications manager 720 is capable of, configured to, or operable to support a means for receiving a message indicating a measurement report occasion configured for transmission of a measurement report, the measurement report associated with a first indicator size for reporting respective indicators of one or more of a set of multiple beams transmitted by a network entity, where the first indicator size is based on a quantity of the set of multiple beams. The communications manager 720 is capable of, configured to, or operable to support a means for measuring a set of multiple reference signals associated with the measurement report to determine one or more potential beams for communications with the network entity. The communications manager 720 is capable of, configured to, or operable to support a means for transmitting the measurement report during the measurement report occasion, the measurement report including one or more indicators, each indicator of the one or more indicators corresponding to a respective beam of the one or more potential beams, where each indicator has a second indicator size smaller than the first indicator size based on a quantity of the one or more potential beams.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for dynamic adjustment of measurement report period or resource indicator size that reduce overhead and power consumption.

Figure 8:
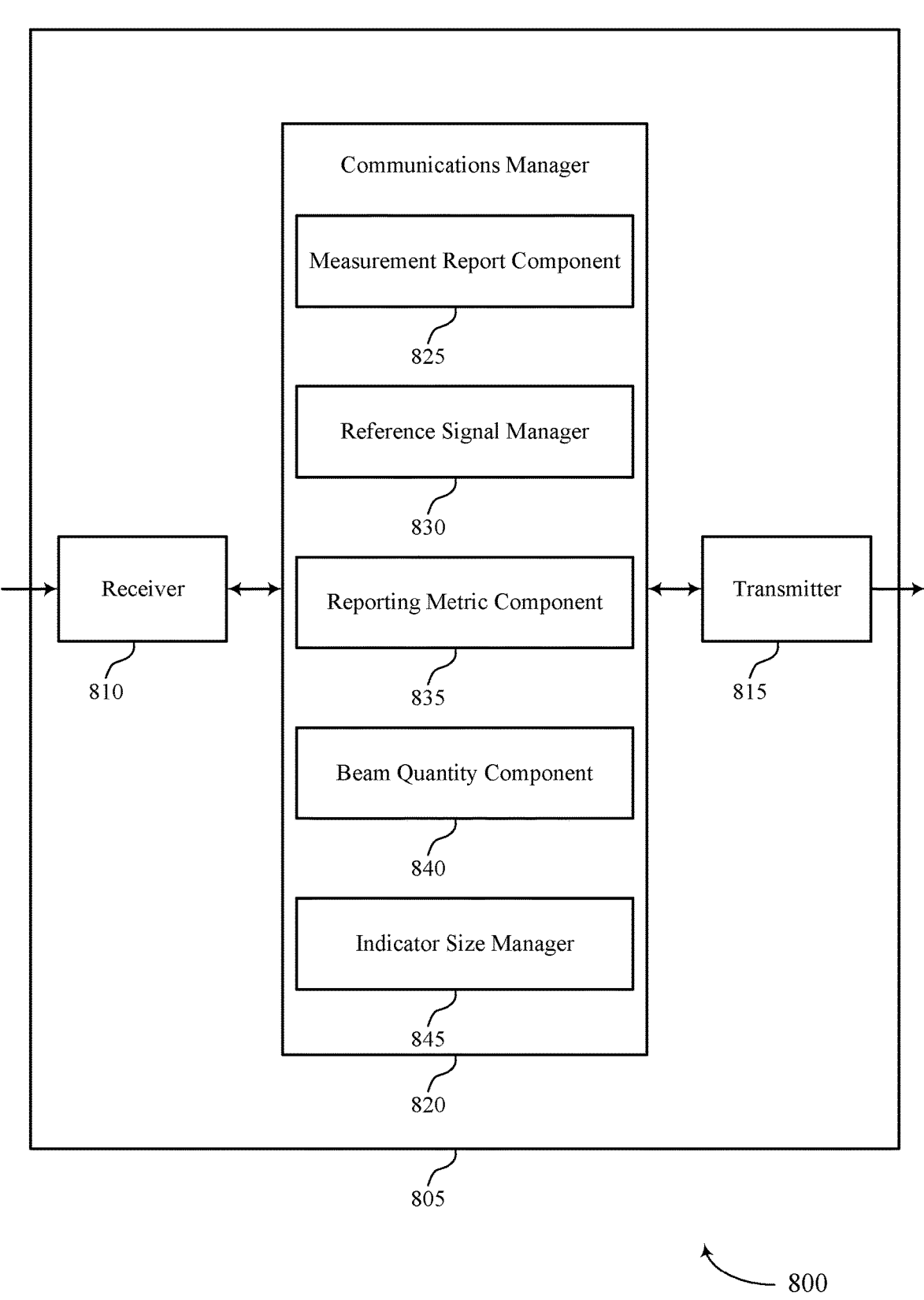

FIG. 8 shows a block diagram 800 of a device 805 that supports dynamic adjustment of measurement reporting characteristics in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to dynamic adjustment of measurement report period or resource indicator size). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to dynamic adjustment of measurement report period or resource indicator size). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of dynamic adjustment of measurement report period or resource indicator size as described herein. For example, the communications manager 820 may include a measurement report component 825, a reference signal manager 830, a reporting metric component 835, a beam quantity component 840, an indicator size manager 845, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications by a UE in accordance with examples as disclosed herein. The measurement report component 825 is capable of, configured to, or operable to support a means for receiving a message indicating a set of measurement report occasions associated with a first periodicity between measurement report occasions of the set of measurement report occasions. The reference signal manager 830 is capable of, configured to, or operable to support a means for measuring a set of multiple reference signals associated with a first subset of the set of measurement report occasions. The reporting metric component 835 is capable of, configured to, or operable to support a means for transmitting a set of multiple measurement reports during the first subset of the set of measurement report occasions with a second periodicity different from the first periodicity, where the second periodicity is based on a reporting metric being within a first value range of a set of value ranges.

Additionally, or alternatively, the communications manager 820 may support wireless communications by a UE in accordance with examples as disclosed herein. The beam quantity component 840 is capable of, configured to, or operable to support a means for receiving a message indicating a measurement report occasion configured for transmission of a measurement report, the measurement report associated with a first indicator size for reporting respective indicators of one or more of a set of multiple beams transmitted by a network entity, where the first indicator size is based on a quantity of the set of multiple beams. The reference signal manager 830 is capable of, configured to, or operable to support a means for measuring a set of multiple reference signals associated with the measurement report to determine one or more potential beams for communications with the network entity. The indicator size manager 845 is capable of, configured to, or operable to support a means for transmitting the measurement report during the measurement report occasion, the measurement report including one or more indicators, each indicator of the one or more indicators corresponding to a respective beam of the one or more potential beams, where each indicator has a second indicator size smaller than the first indicator size based on a quantity of the one or more potential beams.

Figure 9:
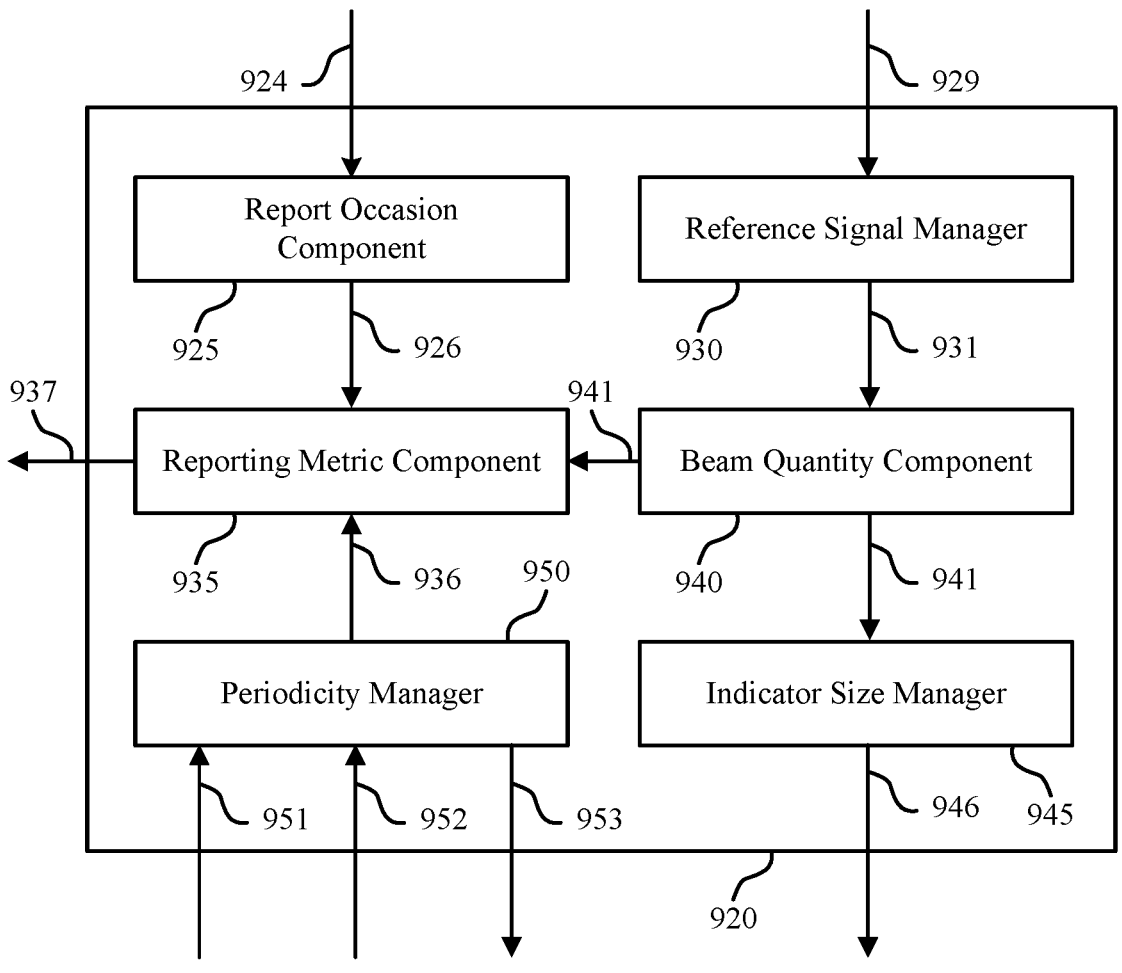
FIG. 9 shows a block diagram of a communications manager that supports dynamic adjustment of measurement reporting characteristics in accordance with one or more aspects of the present disclosure.

FIG. 9 shows a block diagram 900 of a communications manager 920 that supports dynamic adjustment of measurement reporting characteristics in accordance with one or more aspects of the present disclosure. The communications manager 920 may be an example of aspects of a communications manager 720, a communications manager 820, or both, as described herein. The communications manager 920, or various components thereof, may be an example of means for performing various aspects of dynamic adjustment of measurement report period or resource indicator size as described herein. For example, the communications manager 920 may include a report occasion component 925, a reference signal manager 930, a reporting metric component 935, a beam quantity component 940, an indicator size manager 945, a periodicity manager 950, or any combination thereof. Each of these components, or components or subcomponents thereof (e.g., one or more processors, one or more memories), may communicate, directly or indirectly, with one another (e.g., via one or more buses).

The communications manager 920 may support wireless communications by a UE in accordance with examples as disclosed herein. The report occasion component 925 is capable of, configured to, or operable to support a means for receiving a message indicating a set of measurement report occasions (e.g., measurement report occasions 924) associated with a first periodicity between measurement report occasions of the set of measurement report occasions. The reference signal manager 930 is capable of, configured to, or operable to support a means for measuring a set of multiple reference signals (e.g., reference signals 929) associated with a first subset of the set of measurement report occasions. The reporting metric component 935 is capable of, configured to, or operable to support a means for transmitting a set of multiple measurement reports (e.g., measurement reports 937) during the first subset of the set of measurement report occasions (e.g., measurement report occasions 926, which may be a subset of the measurement report occasions 924) with a second periodicity (e.g., a periodicity 936) different from the first periodicity, where the second periodicity is based on a reporting metric being within a first value range of a set of value ranges.

In some examples, the reporting metric includes a received power measurement value, a signal to interference-plus-noise ratio, a value associated with mobility of the UE, a size of a measurement report of the set of multiple measurement reports, a power value associated with the UE, or a combination thereof.

In some examples, the second periodicity is a lower periodicity than the first periodicity. In some examples, the UE suppresses transmission of measurement reports during a second subset of the set of measurement report occasions based on the second periodicity.

In some examples, the reporting metric component 935 is capable of, configured to, or operable to support a means for receiving a second message that indicates the second periodicity based on the reporting metric being within the first value range, where transmitting the set of multiple measurement reports with the second periodicity is based on receiving the second message.

In some examples, the first periodicity is associated with a second value range of the set of value ranges.

In some examples, the reporting metric component 935 is capable of, configured to, or operable to support a means for transmitting a second set of multiple measurement reports during each measurement report occasion of the set of measurement report occasions over a second duration based on a change in the reporting metric, the reporting metric being within the second value range of the set of value ranges for the second duration.

In some examples, the reporting metric component 935 is capable of, configured to, or operable to support a means for transmitting, over a third duration, a third set of multiple measurement reports during a second subset of the set of measurement report occasions with a third periodicity based on a change in the reporting metric, the reporting metric being within a third value range of the set of value ranges for the third duration.

In some examples, the periodicity manager 950 is capable of, configured to, or operable to support a means for receiving a message (e.g., a message 951) that indicates a set of periodicities including at least the first periodicity and the second periodicity, where transmitting the set of multiple measurement reports is based on receiving the message indicating the set of periodicities.

In some examples, the periodicity manager 950 is capable of, configured to, or operable to support a means for receiving a message (e.g., a message 952) that indicates a set of thresholds, where each value range of the set of value ranges is defined based on the set of thresholds.

In some examples, the periodicity manager 950 is capable of, configured to, or operable to support a means for transmitting, prior to transmitting the set of multiple measurement reports, a message (e.g., a message 953) that indicates the second periodicity based on the reporting metric.

In some examples, transmitting the set of multiple measurement reports with the second periodicity is based on detecting a beam failure, detecting that measured values associated with the set of multiple reference signals are below a threshold value, or both.

Additionally, or alternatively, the communications manager 920 may support wireless communications by a UE in accordance with examples as disclosed herein. The beam quantity component 940 is capable of, configured to, or operable to support a means for receiving a message indicating a measurement report occasion configured for transmission of a measurement report, the measurement report associated with a first indicator size for reporting respective indicators of one or more of a set of multiple beams transmitted by a network entity, where the first indicator size is based on a quantity of the set of multiple beams (e.g., beams 931 associated with reference signals 929). In some examples, the reference signal manager 930 is capable of, configured to, or operable to support a means for measuring a set of multiple reference signals associated with the measurement report to determine one or more potential beams for communications with the network entity. The indicator size manager 945 is capable of, configured to, or operable to support a means for transmitting the measurement report (e.g., measurement report 946) during the measurement report occasion, the measurement report including one or more indicators, each indicator of the one or more indicators corresponding to a respective beam of the one or more potential beams, where each indicator has a second indicator size smaller than the first indicator size based on a quantity of the one or more potential beams (e.g., quantity 941).

In some examples, the one or more potential beams are determined based on measurement values associated with the one or more potential beams being above a threshold value, a geographic position of the UE, a transmission and reception point associated with the potential beams, a size limit associated with the measurement report, or any combination thereof.

In some examples, the beam quantity component 940 is capable of, configured to, or operable to support a means for receiving a message that indicates an overloaded status for one or more beams, where the one or more potential beams are determined based on the overloaded status for the one or more beams.

In some examples, the second indicator size is based on a location of the UE, a power limit associated with the UE, measurement values associated with the set of multiple reference signals, or a combination thereof.

In some examples, the indicator size manager 945 is capable of, configured to, or operable to support a means for communicating, prior to the measurement report, a message that indicates the second indicator size.

Figure 10:
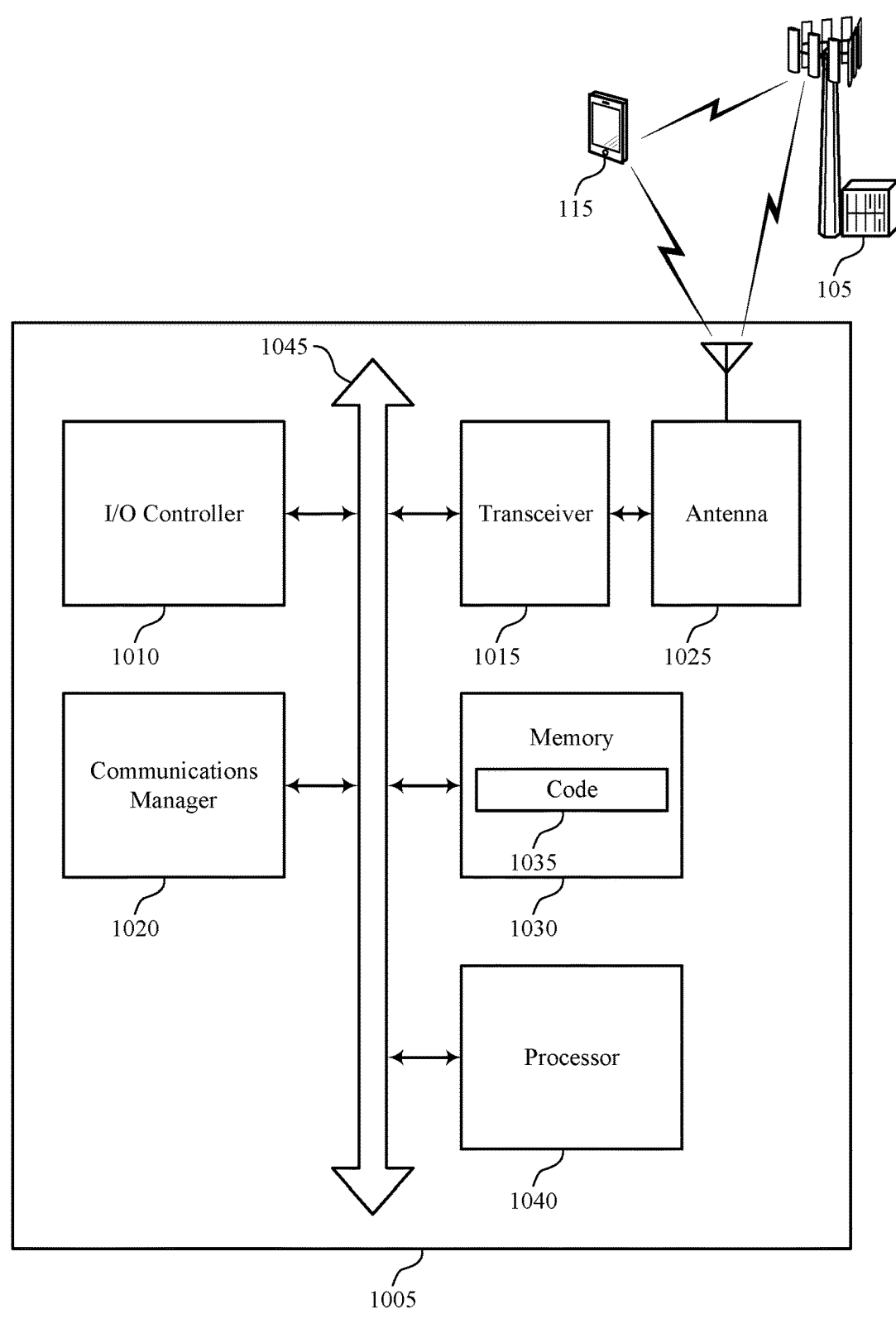
FIG. 10 shows a diagram of a system including a device that supports dynamic adjustment of measurement reporting characteristics in accordance with one or more aspects of the present disclosure.

FIG. 10 shows a diagram of a system 1000 including a device 1005 that supports dynamic adjustment of measurement reporting characteristics in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WIN-DOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting dynamic adjustment of measurement report period or resource indicator size). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors and the at least one memory 1030 may include multiple memories. One or more of the multiple processors may be coupled with one or more of the multiple memories, which may, individually or collectively, be configured to perform various functions herein.

The communications manager 1020 may support wireless communications by a UE in accordance with examples as disclosed herein. For example, the communications manager 1020 is capable of, configured to, or operable to support a means for receiving a message indicating a set of measurement report occasions associated with a first periodicity between measurement report occasions of the set of measurement report occasions. The communications manager 1020 is capable of, configured to, or operable to support a means for measuring a set of multiple reference signals associated with a first subset of the set of measurement report occasions. The communications manager 1020 is capable of, configured to, or operable to support a means for transmitting a set of multiple measurement reports during the first subset of the set of measurement report occasions with a second periodicity different from the first periodicity, where the second periodicity is based on a reporting metric being within a first value range of a set of value ranges.

Additionally, or alternatively, the communications manager 1020 may support wireless communications by a UE in accordance with examples as disclosed herein. For example, the communications manager 1020 is capable of, configured to, or operable to support a means for receiving a message indicating a measurement report occasion configured for transmission of a measurement report, the measurement report associated with a first indicator size for reporting respective indicators of one or more of a set of multiple beams transmitted by a network entity, where the first indicator size is based on a quantity of the set of multiple beams. The communications manager 1020 is capable of, configured to, or operable to support a means for measuring a set of multiple reference signals associated with the measurement report to determine one or more potential beams for communications with the network entity. The communications manager 1020 is capable of, configured to, or operable to support a means for transmitting the measurement report during the measurement report occasion, the measurement report including one or more indicators, each indicator of the one or more indicators corresponding to a respective beam of the one or more potential beams, where each indicator has a second indicator size smaller than the first indicator size based on a quantity of the one or more potential beams.

By including or configuring the communications manager 1020 in accordance with examples as described herein, the device 1005 may support techniques for may support techniques for dynamic adjustment of measurement report period or resource indicator size that reduce overhead and power consumption, which may lead to an enhanced user experience due to longer battery life.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager

1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of dynamic adjustment of measurement report period or resource indicator size as described herein, or the at least one processor 1040 and the at least one memory 1030 may be otherwise configured to, individually or collectively, perform or support such operations.

Figure 11:
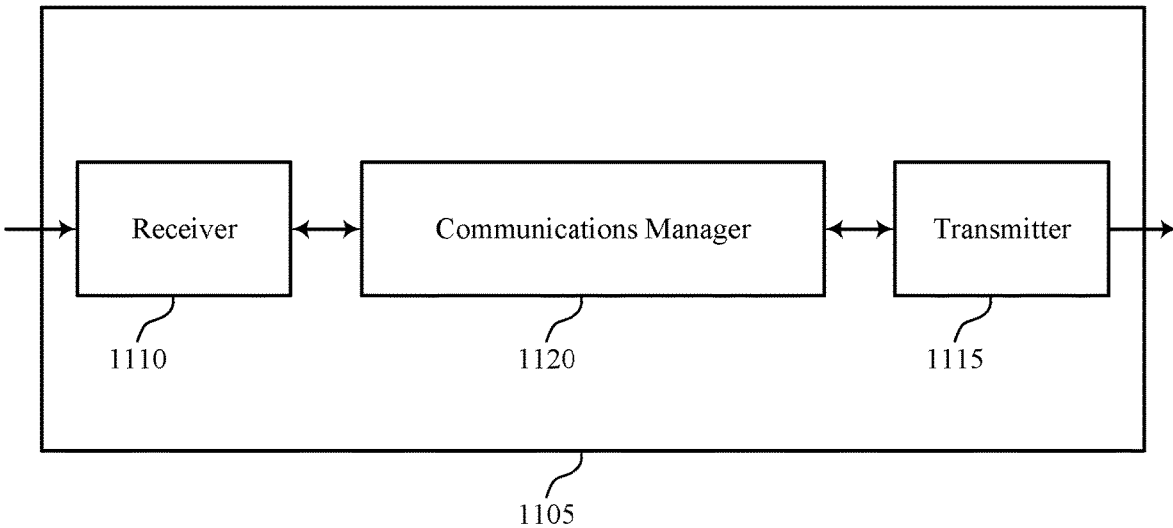
FIGS. 11 and 12 show block diagrams of devices that support dynamic adjustment of measurement reporting characteristics in accordance with one or more aspects of the present disclosure.

FIG. 11 shows a block diagram 1100 of a device 1105 that supports dynamic adjustment of measurement reporting characteristics in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of dynamic adjustment of measurement report period or resource indicator size as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications by a network entity in accordance with examples as disclosed herein. For example, the communications manager 1120 is capable of, configured to, or operable to support a means for transmitting, to a UE, a message indicating a set of measurement report occasions associated with a first periodicity between measurement report occasions of the set of measurement report occasions. The communications manager 1120 is capable of, configured to, or operable to support a means for transmitting a set of multiple reference signals associated with the set of measurement report occasions. The communications manager 1120 is capable of, configured to, or operable to support a means for receiving, from the UE, a set of multiple measurement reports during a first subset of the set of measurement report occasions with a second periodicity different from the first periodicity, where the second periodicity is based on a reporting metric being within a first value range of a set of value ranges.

Additionally, or alternatively, the communications manager 1120 may support wireless communications by a network entity in accordance with examples as disclosed herein. For example, the communications manager 1120 is capable of, configured to, or operable to support a means for transmitting, to a UE, a message indicating a measurement report occasion configured for transmission of a measurement report, the measurement report associated with a first indicator size for reporting respective indicators of one or more of a set of multiple beams transmitted by the network entity, where the first indicator size is based on a quantity of the set of multiple beams. The communications manager 1120 is capable of, configured to, or operable to support a means for transmitting a set of multiple reference signals using the set of multiple beams. The communications manager 1120 is capable of, configured to, or operable to support a means for receiving the measurement report during the measurement report occasion, the measurement report including one or more indicators, each indicator of the one or more indicators corresponding to a respective beam of one or more potential beams for communications with the UE, where each indicator has a second indicator size smaller than the first indicator size based on a quantity of the one or more potential beams.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for may support techniques for dynamic adjustment of measurement report period or resource indicator size that reduce overhead and power consumption.

Figure 12:
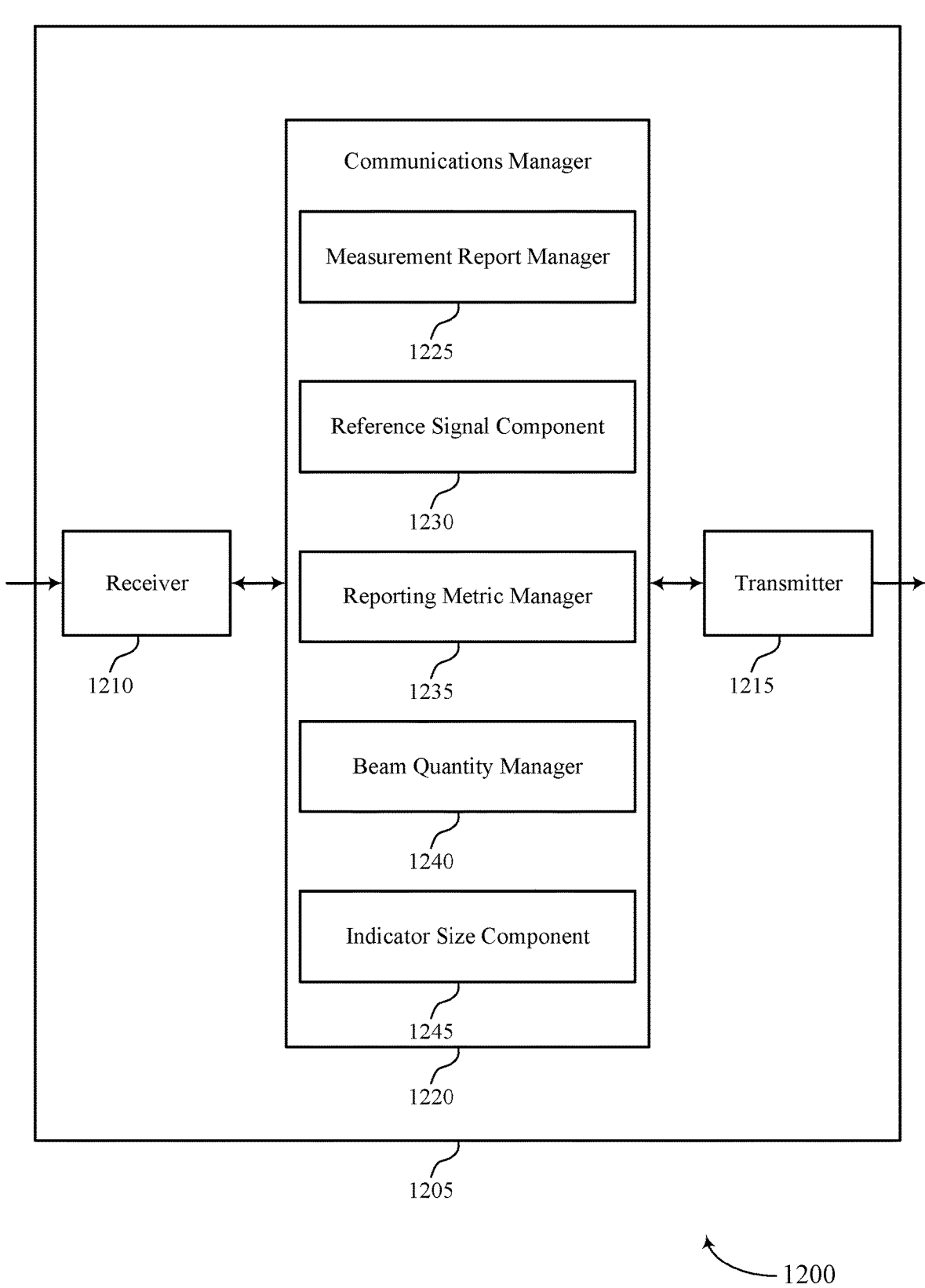

FIG. 12 shows a block diagram 1200 of a device 1205 that supports dynamic adjustment of measurement reporting characteristics in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of dynamic adjustment of measurement report period or resource indicator size as described herein. For example, the communications manager 1220 may include a measurement report manager 1225, a reference signal component 1230, a reporting metric manager 1235, a beam quantity manager 1240, an indicator size component 1245, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications by a network entity in accordance with examples as disclosed herein. The measurement report manager 1225 is capable of, configured to, or operable to support a means for transmitting, to a UE, a message indicating a set of measurement report occasions associated with a first periodicity between measurement report occasions of the set of measurement report occasions. The reference signal component 1230 is capable of, configured to, or operable to support a means for transmitting a set of multiple reference signals associated with the set of measurement report occasions. The reporting metric manager 1235 is capable of, configured to, or operable to support a means for receiving, from the UE, a set of multiple measurement reports during a first subset of the set of measurement report occasions with a second periodicity different from the first periodicity, where the second periodicity is based on a reporting metric being within a first value range of a set of value ranges.

Additionally, or alternatively, the communications manager 1220 may support wireless communications by a network entity in accordance with examples as disclosed herein. The beam quantity manager 1240 is capable of, configured to, or operable to support a means for transmitting, to a UE, a message indicating a measurement report occasion configured for transmission of a measurement report, the measurement report associated with a first indicator size for reporting respective indicators of one or more of a set of multiple beams transmitted by the network entity, where the first indicator size is based on a quantity of the set of multiple beams. The reference signal component 1230 is capable of, configured to, or operable to support a means for transmitting a set of multiple reference signals using the set of multiple beams. The indicator size component 1245 is capable of, configured to, or operable to support a means for receiving the measurement report during the measurement report occasion, the measurement report including one or more indicators, each indicator of the one or more indicators corresponding to a respective beam of one or more potential beams for communications with the UE, where each indicator has a second indicator size smaller than the first indicator size based on a quantity of the one or more potential beams.

Figure 13:
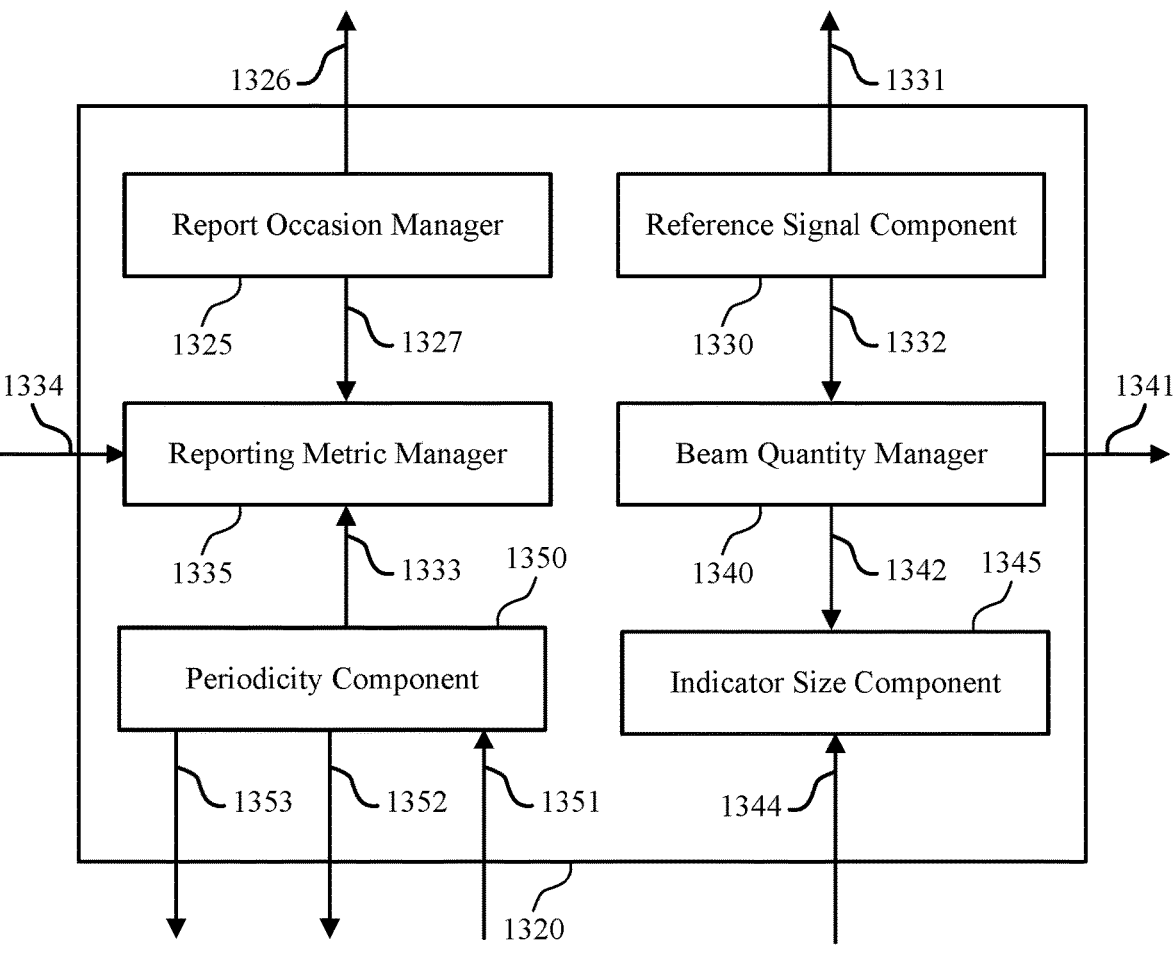
FIG. 13 shows a block diagram of a communications manager that supports dynamic adjustment of measurement reporting characteristics in accordance with one or more aspects of the present disclosure.

FIG. 13 shows a block diagram 1300 of a communications manager 1320 that supports dynamic adjustment of measurement reporting characteristics in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of dynamic adjustment of measurement report period or resource indicator size as described herein. For example, the communications manager 1320 may include a report occasion manager 1325, a reference signal component 1330, a reporting metric manager 1335, a beam quantity manager 1340, an indicator size component 1345, a periodicity component 1350, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications by a network entity in accordance with examples as disclosed herein. The report occasion manager 1325 is capable of, configured to, or operable to support a means for transmitting, to a UE, a message (e.g., message 1326) indicating a set of measurement report occasions associated with a first periodicity between measurement report occasions of the set of measurement report occasions. The reference signal component 1330 is capable of, configured to, or operable to support a means for transmitting a set of multiple reference signals (e.g., reference signals 1331) associated with the set of measurement report occasions. The reporting metric manager 1335 is capable of, configured to, or operable to support a means for receiving, from the UE, a set of multiple measurement reports (e.g., measurement reports 1334) during a first subset of the set of measurement report occasions (e.g., a subset 1327) with a second periodicity (e.g., periodicity 1333) different from the first periodicity, where the second periodicity is based on a reporting metric being within a first value range of a set of value ranges.

In some examples, the reporting metric includes a received power measurement value, a signal to interference-plus-noise ratio, a value associated with mobility of the UE, a size of a measurement report of the set of multiple measurement reports, a power value associated with the UE, or a combination thereof.

In some examples, the second periodicity is a lower periodicity than the first periodicity. In some examples, the network entity suppresses monitoring for measurement reports from the UE during a second subset of the set of measurement report occasions based on the second periodicity.

In some examples, the reporting metric manager 1335 is capable of, configured to, or operable to support a means for transmitting a second message that indicates the second periodicity based on the reporting metric being within the first value range, where receiving the set of multiple measurement reports with the second periodicity is based on receiving the second message.

In some examples, the first periodicity is associated with a second value range of the set of value ranges.

In some examples, the reporting metric manager 1335 is capable of, configured to, or operable to support a means for receiving a second set of multiple measurement reports during each measurement report occasion of the set of measurement report occasions over a second duration based on a change in the reporting metric, the reporting metric being within the second value range of the set of value ranges for the second duration.

In some examples, the reporting metric manager 1335 is capable of, configured to, or operable to support a means for receiving, over a third duration, a third set of multiple measurement reports during a second subset of the set of measurement report occasions with a third periodicity based on a change in the reporting metric, the reporting metric being within a third value range of the set of value ranges for the third duration.

In some examples, the periodicity component 1350 is capable of, configured to, or operable to support a means for transmitting a message (e.g., a message 1351) that indicates a set of periodicities including at least the first periodicity and the second periodicity, where receiving the set of multiple measurement reports is based on receiving the message indicating the set of periodicities.

In some examples, the periodicity component 1350 is capable of, configured to, or operable to support a means for transmitting a message (e.g., a message 1352) that indicates a set of thresholds, where each value range of the set of value ranges is defined based on the set of thresholds.

In some examples, the periodicity component 1350 is capable of, configured to, or operable to support a means for receiving, prior to receiving the set of multiple measurement reports, a message (e.g., a message 1353) that indicates the second periodicity based on the reporting metric.

Additionally, or alternatively, the communications manager 1320 may support wireless communications by a network entity in accordance with examples as disclosed herein. The beam quantity manager 1340 is capable of, configured to, or operable to support a means for transmitting, to a UE, a message (e.g., a message 1341) indicating a measurement report occasion configured for transmission of a measurement report, the measurement report associated with a first indicator size for reporting respective indicators of one or more of a set of multiple beams transmitted by the network entity (e.g., beams 1332 associated with reference signals 1331), where the first indicator size is based on a quantity of the set of multiple beams. In some examples, the reference signal component 1330 is capable of, configured to, or operable to support a means for transmitting a set of multiple reference signals using the set of multiple beams. The indicator size component 1345 is capable of, configured to, or operable to support a means for receiving the measurement report (e.g., measurement report 1344) during the measurement report occasion, the measurement report including one or more indicators, each indicator of the one or more indicators corresponding to a respective beam of one or more potential beams for communications with the UE, where each indicator has a second indicator size smaller than the first indicator size based on a quantity of the one or more potential beams (e.g., a quantity 1342).

In some examples, the one or more potential beams are determined based on measurement values associated with the one or more potential beams being above a threshold value, a geographic position of the UE, a transmission and reception point associated with the one or more potential beams, a size limit associated with the measurement report, or any combination thereof.

In some examples, the beam quantity manager 1340 is capable of, configured to, or operable to support a means for transmitting a message that indicates an overloaded status for one or more beams, where the one or more potential beams are determined based on the overloaded status for the one or more beams.

In some examples, the second indicator size is based on a location of the UE, a power limit associated with the UE, measurement values associated with the set of multiple reference signals, or a combination thereof.

Figure 14:
FIG. 14 shows a diagram of a system including a device that supports dynamic adjustment of measurement reporting characteristics in accordance with one or more aspects of the present disclosure.

FIG. 14 shows a diagram of a system 1400 including a device 1405 that supports dynamic adjustment of measurement reporting characteristics in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., a communication link 125, a backhaul communication link 120, a midhaul communication link 162, a fronthaul communication link 168).

The at least one memory 1425 may include RAM, ROM, or any combination thereof. The at least one memory 1425 may store computer-readable, computer-executable code 1430 including instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting dynamic adjustment of measurement report period or resource indicator size). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425). In some implementations, the at least one processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the at least one processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications by a network entity in accordance with examples as disclosed herein. For example, the communications manager 1420 is capable of, configured to, or operable to support a means for transmitting, to a UE, a message indicating a set of measurement report occasions associated with a first periodicity between measurement report occasions of the set of measurement report occasions. The communications manager 1420 is capable of, configured to, or operable to support a means for transmitting a set of multiple reference signals associated with the set of measurement report occasions. The communications manager 1420 is capable of, configured to, or operable to support a means for receiving, from the UE, a set of multiple measurement reports during a first subset of the set of measurement report occasions with a second periodicity different from the first periodicity, where the second periodicity is based on a reporting metric being within a first value range of a set of value ranges.

Additionally, or alternatively, the communications manager 1420 may support wireless communications by a network entity in accordance with examples as disclosed herein. For example, the communications manager 1420 is capable of, configured to, or operable to support a means for transmitting, to a UE, a message indicating a measurement report occasion configured for transmission of a measurement report, the measurement report associated with a first indicator size for reporting respective indicators of one or more of a set of multiple beams transmitted by the network entity, where the first indicator size is based on a quantity of the set of multiple beams. The communications manager 1420 is capable of, configured to, or operable to support a means for transmitting a set of multiple reference signals using the set of multiple beams. The communications manager 1420 is capable of, configured to, or operable to support a means for receiving the measurement report during the measurement report occasion, the measurement report including one or more indicators, each indicator of the one or more indicators corresponding to a respective beam of one or more potential beams for communications with the UE, where each indicator has a second indicator size smaller than the first indicator size based on a quantity of the one or more potential beams.

By including or configuring the communications manager 1420 in accordance with examples as described herein, the device 1405 may support techniques for may support techniques for dynamic adjustment of measurement report period or resource indicator size that reduce overhead and power consumption, which may lead to an enhanced user experience due to longer battery life and reduced processing.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of dynamic adjustment of measurement report period or resource indicator size as described herein, or the at least one processor 1435 and the at least one memory 1425 may be otherwise configured to, individually or collectively, perform or support such operations.

FIG. 15 shows a flowchart illustrating a method 1500 that supports dynamic adjustment of measurement reporting characteristics in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a message indicating a set of measurement report occasions associated with a first periodicity between measurement report occasions of the set of measurement report occasions. The operations of block 1505 may be performed in accordance with examples as disclosed herein. For example, the method may include receiving a control message, such as an RRC message, that indicates the set of measurement report occasions. In some examples, the measurement report occasions may include time occasions, frequency resources, or both. In some cases, the measurement report occasions may be indicated within CSI resource settings (e.g., CSI-ResourceConfig) indicated in the message. In some examples, aspects of the operations of 1505 may be performed by a report occasion component 925 as described with reference to FIG. 9.

At 1510, the method may include measuring a set of multiple reference signals associated with a first subset of the set of measurement report occasions. The operations of block 1510 may be performed in accordance with examples as disclosed herein. For example, the method may include measuring a set of reference signals which may include NZP CSI-RSs, SSB reference signals, CSI-IM reference signals, CSI-RSs, or a combination thereof. In some cases, the set of reference signals (e.g., the type of reference signals) may be indicated by the message, such as in the CSI resource settings. In some examples, aspects of the operations of 1510 may be performed by a reference signal manager 930 as described with reference to FIG. 9.

At 1515, the method may include transmitting a set of multiple measurement reports during the first subset of the set of measurement report occasions with a second periodicity different from the first periodicity, where the second periodicity is based on a reporting metric being within a first value range of a set of value ranges. The operations of block 1515 may be performed in accordance with examples as disclosed herein. For example, the method may include transmitting the set of measurement reports via PUSCH messages or PUCCH messages. In some examples, aspects of the operations of 1515 may be performed by a reporting metric component 935 as described with reference to FIG. 9.

FIG. 16 shows a flowchart illustrating a method 1600 that supports dynamic adjustment of measurement reporting characteristics in accordance with aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, a message indicating a set of measurement report occasions associated with a first periodicity between measurement report occasions of the set of measurement report occasions. The operations of block 1605 may be performed in accordance with examples as disclosed herein. For example, the method may include transmitting a control message, such as an RRC message, that indicates the set of measurement report occasions. In some examples, the measurement report occasions may include time occasions, frequency resources, or both. In some cases, the measurement report occasions may be indicated within CSI resource settings (e.g., CSI-ResourceConfig) indicated in the message. In some examples, aspects of the operations of 1605 may be performed by a report occasion manager 1325 as described with reference to FIG. 13.

At 1610, the method may include transmitting a set of multiple reference signals associated with the set of measurement report occasions. The operations of block 1610 may be performed in accordance with examples as disclosed herein. For example, the method may include transmitting a set of reference signals which may include NZP CSI-RSs, SSB reference signals, CSI-IM reference signals, CSI-RSs, or a combination thereof. In some cases, the set of reference signals (e.g., the type of reference signals) may be indicated by the message, such as in the CSI resource settings. In some examples, aspects of the operations of 1610 may be performed by a reference signal component 1330 as described with reference to FIG. 13.

At 1615, the method may include receiving, from the UE, a set of multiple measurement reports during a first subset of the set of measurement report occasions with a second periodicity different from the first periodicity, where the second periodicity is based on a reporting metric being within a first value range of a set of value ranges. The operations of block 1615 may be performed in accordance with examples as disclosed herein. For example, the method may include receiving the set of measurement reports via PUSCH messages or PUCCH messages. In some examples, aspects of the operations of 1615 may be performed by a reporting metric manager 1335 as described with reference to FIG. 13.

FIG. 17 shows a flowchart illustrating a method 1700 that supports dynamic adjustment of measurement reporting characteristics in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving a message indicating a measurement report occasion configured for transmission of a measurement report, the measurement report associated with a first indicator size for reporting respective indicators of one or more of a set of multiple beams transmitted by a network entity, where the first indicator size is based on a quantity of the set of multiple beams. The operations of block 1705 may be performed in accordance with examples as disclosed herein. For example, the method may include receiving a control message, such as an RRC message, that indicates the set of measurement report occasions. In some examples, the measurement report occasions may include time occasions, frequency resources, or both. In some cases, the measurement report occasions may be indicated within CSI resource settings (e.g., CSI-ResourceConfig) indicated in the message. In some examples, aspects of the operations of 1705 may be performed by a beam quantity component 940 as described with reference to FIG. 9.

At 1710, the method may include measuring a set of multiple reference signals associated with the measurement report to determine one or more potential beams for communications with the network entity. The operations of block 1710 may be performed in accordance with examples as disclosed herein. For example, the method may include measuring a set of reference signals which may include NZP CSI-RSs, SSB reference signals, CSI-IM reference signals, CSI-RSs, or a combination thereof. In some cases, the set of reference signals (e.g., the type of reference signals) may be indicated by the message, such as in the CSI resource settings. In some examples, aspects of the operations of 1710 may be performed by a reference signal manager 930 as described with reference to FIG. 9.

At 1715, the method may include transmitting the measurement report during the measurement report occasion, the measurement report including one or more indicators, each indicator of the one or more indicators corresponding to a respective beam of the one or more potential beams, where each indicator has a second indicator size smaller than the first indicator size based on a quantity of the one or more potential beams. The operations of block 1715 may be performed in accordance with examples as disclosed herein. For example, the method may include transmitting the set of measurement reports via PUSCH messages or PUCCH messages. In some examples, aspects of the operations of 1715 may be performed by an indicator size manager 945 as described with reference to FIG. 9.

FIG. 18 shows a flowchart illustrating a method 1800 that supports dynamic adjustment of measurement reporting characteristics in accordance with aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to a UE, a message indicating a measurement report occasion configured for transmission of a measurement report, the measurement report associated with a first indicator size for reporting respective indicators of one or more of a set of multiple beams transmitted by the network entity, where the first indicator size is based on a quantity of the set of multiple beams. The operations of block 1805 may be performed in accordance with examples as disclosed herein. For example, the method may include transmitting a control message, such as an RRC message, that indicates the set of measurement report occasions. In some examples, the measurement report occasions may include time occasions, frequency resources, or both. In some cases, the measurement report occasions may be indicated within CSI resource settings (e.g., CSI-ResourceConfig) indicated in the message. In some examples, aspects of the operations of 1805 may be performed by a beam quantity manager 1340 as described with reference to FIG. 13.

At 1810, the method may include transmitting a set of multiple reference signals using the set of multiple beams. The operations of block 1810 may be performed in accordance with examples as disclosed herein. For example, the method may include transmitting a set of reference signals which may include NZP CSI-RSs, SSB reference signals, CSI-IM reference signals, CSI-RSs, or a combination thereof. In some cases, the set of reference signals (e.g., the type of reference signals) may be indicated by the message, such as in the CSI resource settings. In some examples, aspects of the operations of 1810 may be performed by a reference signal component 1330 as described with reference to FIG. 13.

At 1815, the method may include receiving the measurement report during the measurement report occasion, the measurement report including one or more indicators, each indicator of the one or more indicators corresponding to a respective beam of one or more potential beams for communications with the UE, where each indicator has a second indicator size smaller than the first indicator size based on a quantity of the one or more potential beams. The operations of block 1815 may be performed in accordance with examples as disclosed herein. For example, the method may include receiving the set of measurement reports via PUSCH messages or PUCCH messages. In some examples, aspects of the operations of 1815 may be performed by an indicator size component 1345 as described with reference to FIG. 13.

The following provides an overview of aspects of the present disclosure:

Aspect 1: A method for wireless communications by a UE, comprising: receiving a message indicating a set of measurement report occasions associated with a first periodicity between measurement report occasions of the set of measurement report occasions; measuring a plurality of reference signals associated with a first subset of the set of measurement report occasions; and transmitting a plurality of measurement reports during the first subset of the set of measurement report occasions with a second periodicity different from the first periodicity, wherein the second periodicity is based at least in part on a reporting metric being within a first value range of a set of value ranges.

Aspect 2: The method of aspect 1, wherein the reporting metric comprises a received power measurement value, a signal to interference-plus-noise ratio, a value associated with mobility of the UE, a size of a measurement report of the plurality of measurement reports, a power value associated with the UE, or a combination thereof.

Aspect 3: The method of any of aspects 1 through 2, wherein the second periodicity is a lower periodicity than the first periodicity, and the UE suppresses transmission of measurement reports during a second subset of the set of measurement report occasions based at least in part on the second periodicity.

Aspect 4: The method of any of aspects 1 through 3, further comprising: receiving a second message that indicates the second periodicity based at least in part on the reporting metric being within the first value range, wherein transmitting the plurality of measurement reports with the second periodicity is based at least in part on receiving the second message.

Aspect 5: The method of any of aspects 1 through 4, wherein the first periodicity is associated with a second value range of the set of value ranges.

Aspect 6: The method of aspect 5, wherein transmitting the plurality of measurement reports occurs over a first duration, the method further comprising: transmitting a second plurality of measurement reports during each measurement report occasion of the set of measurement report occasions over a second duration based at least in part on a change in the reporting metric, the reporting metric being within the second value range of the set of value ranges for the second duration.

Aspect 7: The method of any of aspects 5 through 6, further comprising: transmitting, over a third duration, a third plurality of measurement reports during a second subset of the set of measurement report occasions with a third periodicity based at least in part on a change in the reporting metric, the reporting metric being within a third value range of the set of value ranges for the third duration.

Aspect 8: The method of any of aspects 1 through 7, further comprising: receiving a message that indicates a set of periodicities comprising at least the first periodicity and the second periodicity, wherein transmitting the plurality of measurement reports is based at least in part on receiving the message indicating the set of periodicities.

Aspect 9: The method of any of aspects 1 through 8, further comprising: receiving a message that indicates a set of thresholds, wherein each value range of the set of value ranges is defined based at least in part on the set of thresholds.

Aspect 10: The method of any of aspects 1 through 3 and 5 through 9, further comprising: transmitting, prior to transmitting the plurality of measurement reports, a message that indicates the second periodicity based at least in part on the reporting metric.

Aspect 11: The method of any of aspects 1 through 10, wherein transmitting the plurality of measurement reports with the second periodicity is based at least in part on detecting a beam failure, detecting that measured values associated with the plurality of reference signals are below a threshold value, or both.

Aspect 12: A method for wireless communications by a network entity, comprising: transmitting, to a UE, a message indicating a set of measurement report occasions associated with a first periodicity between measurement report occasions of the set of measurement report occasions; transmitting a plurality of reference signals associated with the set of measurement report occasions; and receiving, from the UE, a plurality of measurement reports during a first subset of the set of measurement report occasions with a second periodicity different from the first periodicity, wherein the second periodicity is based at least in part on a reporting metric being within a first value range of a set of value ranges.

Aspect 13: The method of aspect 12, wherein the reporting metric comprises a received power measurement value, a signal to interference-plus-noise ratio, a value associated with mobility of the UE, a size of a measurement report of the plurality of measurement reports, a power value associated with the UE, or a combination thereof.

Aspect 14: The method of any of aspects 12 through 13, wherein the second periodicity is a lower periodicity than the first periodicity, and the network entity suppresses monitoring for measurement reports from the UE during a second subset of the set of measurement report occasions based at least in part on the second periodicity.

Aspect 15: The method of any of aspects 12 through 14, further comprising: transmitting a second message that indicates the second periodicity based at least in part on the reporting metric being within the first value range, wherein receiving the plurality of measurement reports with the second periodicity is based at least in part on receiving the second message.

Aspect 16: The method of any of aspects 12 through 15, wherein the first periodicity is associated with a second value range of the set of value ranges.

Aspect 17: The method of aspect 16, wherein receiving the plurality of measurement reports occurs over a first duration, the method further comprising: receiving a second plurality of measurement reports during each measurement report occasion of the set of measurement report occasions over a second duration based at least in part on a change in the reporting metric, the reporting metric being within the second value range of the set of value ranges for the second duration.

Aspect 18: The method of any of aspects 16 through 17, further comprising: receiving, over a third duration, a third plurality of measurement reports during a second subset of the set of measurement report occasions with a third periodicity based at least in part on a change in the reporting metric, the reporting metric being within a third value range of the set of value ranges for the third duration.

Aspect 19: The method of any of aspects 12 through 18, further comprising: transmitting a message that indicates a set of periodicities comprising at least the first periodicity and the second periodicity, wherein receiving the plurality of measurement reports is based at least in part on receiving the message indicating the set of periodicities.

Aspect 20: The method of any of aspects 12 through 19, further comprising: transmitting a message that indicates a set of thresholds, wherein each value range of the set of value ranges is defined based at least in part on the set of thresholds.

Aspect 21: The method of any of aspects 12 through 14 and 16 through 20, further comprising: receiving, prior to receiving the plurality of measurement reports, a message that indicates the second periodicity based at least in part on the reporting metric.

Aspect 22: A method for wireless communications by a UE, comprising: receiving a message indicating a measurement report occasion configured for transmission of a measurement report, the measurement report associated with a first indicator size for reporting respective indicators of one or more of a plurality of beams transmitted by a network entity, wherein the first indicator size is based at least in part on a quantity of the plurality of beams; measuring a plurality of reference signals associated with the measurement report to determine one or more potential beams for communications with the network entity; and transmitting the measurement report during the measurement report occasion, the measurement report comprising one or more indicators, each indicator of the one or more indicators corresponding to a respective beam of the one or more potential beams, wherein the each indicator has a second indicator size smaller than the first indicator size based at least in part on a quantity of the one or more potential beams.

Aspect 23: The method of aspect 22, wherein the one or more potential beams are determined based on measurement values associated with the one or more potential beams being above a threshold value, a geographic position of the UE, a transmission and reception point associated with the potential beams, a size limit associated with the measurement report, or any combination thereof.

Aspect 24: The method of any of aspects 22 through 23, further comprising: receiving a message that indicates an overloaded status for one or more beams, wherein the one or more potential beams are determined based at least in part on the overloaded status for the one or more beams.

Aspect 25: The method of any of aspects 22 through 24, wherein the second indicator size is based at least in part on a location of the UE, a power limit associated with the UE, measurement values associated with the plurality of reference signals, or a combination thereof.

Aspect 26: The method of any of aspects 22 through 25, further comprising: communicating, prior to the measurement report, a message that indicates the second indicator size.

Aspect 27: A method for wireless communications by a network entity, comprising: transmitting, to a UE, a message indicating a measurement report occasion configured for transmission of a measurement report, the measurement report associated with a first indicator size for reporting respective indicators of one or more of a plurality of beams transmitted by the network entity, wherein the first indicator size is based at least in part on a quantity of the plurality of beams; transmitting a plurality of reference signals using the plurality of beams; and receiving the measurement report during the measurement report occasion, the measurement report comprising one or more indicators, each indicator of the one or more indicators corresponding to a respective beam of one or more potential beams for communications with the UE, wherein each indicator has a second indicator size smaller than the first indicator size based at least in part on a quantity of the one or more potential beams.

Aspect 28: The method of aspect 27, wherein the one or more potential beams are determined based on measurement values associated with the one or more potential beams being above a threshold value, a geographic position of the UE, a transmission and reception point associated with the one or more potential beams, a size limit associated with the measurement report, or any combination thereof.

Aspect 29: The method of any of aspects 27 through 28, further comprising: transmitting a message that indicates an overloaded status for one or more beams, wherein the one or more potential beams are determined based at least in part on the overloaded status for the one or more beams.

Aspect 30: The method of any of aspects 27 through 29, wherein the second indicator size is based at least in part on a location of the UE, a power limit associated with the UE, measurement values associated with the plurality of reference signals, or a combination thereof.

Aspect 31: A UE for wireless communications, comprising one or more memories storing processor-executable code, and one or more processors coupled with the one or more memories and individually or collectively operable to execute the code to cause the UE to perform a method of any of aspects 1 through 11.

Aspect 32: A UE for wireless communications, comprising at least one means for performing a method of any of aspects 1 through 11.

Aspect 33: A non-transitory computer-readable medium storing code for wireless communications, the code comprising instructions executable by a processor to perform a method of any of aspects 1 through 11.

Aspect 34: A network entity for wireless communications, comprising one or more memories storing processor-executable code, and one or more processors coupled with the one or more memories and individually or collectively operable to execute the code to cause the network entity to perform a method of any of aspects 12 through 21.

Aspect 35: A network entity for wireless communications, comprising at least one means for performing a method of any of aspects 12 through 21.

Aspect 36: A non-transitory computer-readable medium storing code for wireless communications, the code comprising instructions executable by a processor to perform a method of any of aspects 12 through 21.

Aspect 37: A UE for wireless communications, comprising one or more memories storing processor-executable code, and one or more processors coupled with the one or more memories and individually or collectively operable to execute the code to cause the UE to perform a method of any of aspects 22 through 26.

Aspect 38: A UE for wireless communications, comprising at least one means for performing a method of any of aspects 22 through 26.

Aspect 39: A non-transitory computer-readable medium storing code for wireless communications, the code comprising instructions executable by a processor to perform a method of any of aspects 22 through 26.

Aspect 40: A network entity for wireless communications, comprising one or more memories storing processor-executable code, and one or more processors coupled with the one or more memories and individually or collectively operable to execute the code to cause the network entity to perform a method of any of aspects 27 through 30.

Aspect 41: A network entity for wireless communications, comprising at least one means for performing a method of any of aspects 27 through 30.

Aspect 42: A non-transitory computer-readable medium storing code for wireless communications, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
   one or more memories; and
   one or more processors coupled with the one or more memories and individually or collectively configured to cause the UE to:
   receive a message indicating a set of measurement report occasions associated with a first periodicity between measurement report occasions;
   measure a plurality of reference signals associated with a first subset of the set of measurement report occasions; and transmit a plurality of measurement reports during the first subset of the set of measurement report occasions using a second periodicity, the second periodicity being different from the first periodicity, wherein the second periodicity is based at least in part on a reporting metric being within a value range, and wherein the reporting metric comprises a value associated with mobility of the UE, a size of a measurement report of the plurality of measurement reports, or both.

2. The UE of claim 1, wherein at least one of:

the second periodicity is a lower periodicity than the first periodicity; or transmitting the plurality of measurement reports using the second periodicity comprises suppressing transmission of measurement reports during a second subset of the set of measurement report occasions.

3. The UE of claim 1, wherein the one or more processors are further configured to cause the UE to:

receive a second message that indicates the second periodicity based at least in part on the reporting metric being within the value range, wherein transmitting the plurality of measurement reports with the second periodicity is based at least in part on receiving the second message.

4. The UE of claim 1, wherein the first periodicity is associated with a second value range of a set of value ranges, the set of value ranges comprising at least the value range and the second value range.

5. The UE of claim 4, wherein transmitting the plurality of measurement reports occurs over a first duration, and the one or more processors are further configured to cause the UE to:

transmit a second plurality of measurement reports during each measurement report occasion of the set of measurement report occasions over a second duration based at least in part on a change in the reporting metric, the reporting metric being within the second value range of the set of value ranges for the second duration.

6. The UE of claim 4, wherein the one or more processors are further configured to cause the UE to:

transmit, over a third duration, a third plurality of measurement reports during a second subset of the set of measurement report occasions with a third periodicity based at least in part on a change in the reporting metric, the reporting metric being within a third value range of the set of value ranges for the third duration.

7. The UE of claim 1, wherein the one or more processors are further configured to cause the UE to:

receive a message that indicates a set of periodicities comprising at least the first periodicity and the second periodicity, wherein transmitting the plurality of measurement reports is based at least in part on receiving the message indicating the set of periodicities.

8. The UE of claim 1, wherein the one or more processors are further configured to cause the UE to:

receive a message that indicates a set of thresholds, wherein each value range of a set of value ranges is defined based at least in part on the set of thresholds, the set of value ranges comprising at least the value range.

9. The UE of claim 1, wherein the one or more processors are further configured to cause the UE to:

transmit, prior to transmitting the plurality of measurement reports, a message that indicates the second periodicity based at least in part on the reporting metric.

10. The UE of claim 1, wherein transmitting the plurality of measurement reports with the second periodicity is based at least in part on detecting a beam failure, detecting that measured values associated with the plurality of reference signals are below a threshold value, or both.

11. A network entity for wireless communications, comprising:

one or more memories; and one or more processors coupled with the one or more memories and individually or collectively configured to cause the network entity to:

transmit, to a user equipment (UE), a message indicating a set of measurement report occasions associated with a first periodicity between measurement report occasions;

transmit a plurality of reference signals associated with the set of measurement report occasions; and receive, from the UE, a plurality of measurement reports during a first subset of the set of measurement report occasions with a second periodicity different from the first periodicity, wherein the second periodicity is based at least in part on a reporting metric being within a value range, and wherein the reporting metric comprises a value associated with mobility of the UE, a size of a measurement report of the plurality of measurement reports, or both.

12. The network entity of claim 11, wherein at least one of:

the second periodicity is a lower periodicity than the first periodicity; or the network entity suppresses monitoring for measurement reports from the UE during a second subset of the set of measurement report occasions.

13. The network entity of claim 11, wherein the one or more processors are further configured to cause the network entity to:

transmit a second message that indicates the second periodicity based at least in part on the reporting metric being within the value range, wherein receiving the plurality of measurement reports with the second periodicity is based at least in part on receiving the second message.

14. The network entity of claim 11, wherein the first periodicity is associated with a second value range of a set of value ranges, the set of value ranges comprising at least the value range and the second value range.

15. The network entity of claim 14, wherein receiving the plurality of measurement reports occurs over a first duration, and the one or more processors are further configured to cause the network entity to:

receive a second plurality of measurement reports during each measurement report occasion of the set of measurement report occasions over a second duration based at least in part on a change in the reporting metric, the reporting metric being within the second value range of the set of value ranges for the second duration.

16. The network entity of claim 14, wherein the one or more processors are further configured to cause the network entity to:

receive, over a third duration, a third plurality of measurement reports during a second subset of the set of measurement report occasions with a third periodicity based at least in part on a change in the reporting metric, the reporting metric being within a third value range of the set of value ranges for the third duration.

17. The network entity of claim 11, wherein the one or more processors are further configured to cause the network entity to:

transmit a message that indicates a set of periodicities comprising at least the first periodicity and the second periodicity, wherein receiving the plurality of measurement reports is based at least in part on receiving the message indicating the set of periodicities.

18. The network entity of claim 11, wherein the one or more processors are further configured to cause the network entity to:

transmit a message that indicates a set of thresholds, wherein each value range of a set of value ranges is defined based at least in part on the set of thresholds, the set of value ranges comprising at least the value range.

19. The network entity of claim 11, wherein the one or more processors are further configured to cause the network entity to:

receive, prior to receiving the plurality of measurement reports, a message that indicates the second periodicity based at least in part on the reporting metric.

20. A method for wireless communications at a user equipment (UE), comprising:

receiving a message indicating a set of measurement report occasions associated with a first periodicity between measurement report occasions;

measuring a plurality of reference signals associated with a first subset of the set of measurement report occasions; and transmitting a plurality of measurement reports during the first subset of the set of measurement report occasions using a second periodicity, the second periodicity being different from the first periodicity, wherein the second periodicity is based at least in part on a reporting metric being within a value range, and wherein the reporting metric comprises a value associated with mobility of the UE, a size of a measurement report of the plurality of measurement reports, or both.

21. The method of claim 20, wherein at least one of:

the second periodicity is a lower periodicity than the first periodicity; or transmitting the plurality of measurement reports using the second periodicity comprises suppressing transmission of measurement reports during a second subset of the set of measurement report occasions.

22. The method of claim 20, further comprising:

receiving a second message that indicates the second periodicity based at least in part on the reporting metric being within the value range, wherein transmitting the plurality of measurement reports with the second periodicity is based at least in part on receiving the second message.

23. The method of claim 20, wherein the first periodicity is associated with a second value range of a set of value ranges, the set of value ranges comprising at least the value range and the second value range.

24. The method of claim 23, wherein transmitting the plurality of measurement reports occurs over a first duration, the method further comprising:

transmitting a second plurality of measurement reports during each measurement report occasion of the set of measurement report occasions over a second duration based at least in part on a change in the reporting metric, the reporting metric being within the second value range of the set of value ranges for the second duration.

25. The method of claim 23, further comprising:

transmitting, over a third duration, a third plurality of measurement reports during a second subset of the set of measurement report occasions with a third periodicity based at least in part on a change in the reporting metric, the reporting metric being within a third value range of the set of value ranges for the third duration.

26. A method for wireless communications at a network entity, comprising:

transmitting, to a user equipment (UE), a message indicating a set of measurement report occasions associated with a first periodicity between measurement report occasions;

transmitting a plurality of reference signals associated with the set of measurement report occasions; and receiving, from the UE, a plurality of measurement reports during a first subset of the set of measurement report occasions with a second periodicity different from the first periodicity, wherein the second periodicity is based at least in part on a reporting metric being within a value range, and wherein the reporting metric comprises a value associated with mobility of the UE, a size of a measurement report of the plurality of measurement reports, or both.

27. A user equipment (UE) for wireless communications, comprising:

one or more memories; and one or more processors coupled with the one or more memories and individually or collectively configured to cause the UE to:

receive a message indicating a set of measurement report occasions associated with a first periodicity between measurement report occasions;

measure a plurality of reference signals associated with a first subset of the set of measurement report occasions;

transmit, prior to transmitting a plurality of measurement reports, a message that indicates a second periodicity based at least in part on a reporting metric; and transmit the plurality of measurement reports during the first subset of the set of measurement report occasions using the second periodicity, the second periodicity being different from the first periodicity, wherein the second periodicity is based at least in part on the reporting metric being within a value range.

28. A network entity for wireless communications, comprising:

one or more memories; and one or more processors coupled with the one or more memories and individually or collectively configured to cause the network entity to:

transmit, to a user equipment (UE), a message indicating a set of measurement report occasions associated with a first periodicity between measurement report occasions;

transmit a plurality of reference signals associated with the set of measurement report occasions;

receive, prior to receiving the plurality of measurement reports, a message that indicates a second periodicity based at least in part on a reporting metric; and receive, from the UE, the plurality of measurement reports during a first subset of the set of measurement report occasions with the second periodicity different from the first periodicity, wherein the second periodicity is based at least in part on the reporting metric being within a value range.

29. A method for wireless communications at a user equipment (UE), comprising:

receiving a message indicating a set of measurement report occasions associated with a first periodicity between measurement report occasions;

measuring a plurality of reference signals associated with a first subset of the set of measurement report occasions;

transmitting, prior to transmitting a plurality of measurement reports, a message that indicates a second periodicity based at least in part on a reporting metric; and transmitting the plurality of measurement reports during the first subset of the set of measurement report occasions using the second periodicity, the second periodicity being different from the first periodicity, wherein the second periodicity is based at least in part on the reporting metric being within a value range.

30. A method for wireless communications at a network entity, comprising:

transmitting, to a user equipment (UE), a message indicating a set of measurement report occasions associated with a first periodicity between measurement report occasions;

transmitting a plurality of reference signals associated with the set of measurement report occasions;

receiving, prior to receiving a plurality of measurement reports, a message that indicates a second periodicity based at least in part on a reporting metric; and receiving, from the UE, the plurality of measurement reports during a first subset of the set of measurement report occasions with the second periodicity different from the first periodicity, wherein the second periodicity is based at least in part on the reporting metric being within a value range.

* * * * *